US011108630B2

(12) United States Patent
Woodland et al.

(10) Patent No.: US 11,108,630 B2
(45) Date of Patent: Aug. 31, 2021

(54) HIERARCHICAL CONFIGURATION OF NETWORKED COMMUNICATION DEVICES

(71) Applicant: Itron, Inc., Liberty Lake, WA (US)

(72) Inventors: Bernard M. Woodland, Cary, NC (US); Scott M. Collins, Wake Forest, NC (US)

(73) Assignee: Itron, Inc., Liberty Lake, WA (US)

( * ) Notice: Subject to any disclaimer, the term of this patent is extended or adjusted under 35 U.S.C. 154(b) by 39 days.

(21) Appl. No.: 16/156,368

(22) Filed: Oct. 10, 2018

(65) Prior Publication Data

US 2020/0119979 A1    Apr. 16, 2020

(51) Int. Cl.
*H04L 12/24* (2006.01)
*H04L 29/08* (2006.01)

(52) U.S. Cl.
CPC ........ *H04L 41/082* (2013.01); *H04L 41/0893* (2013.01); *H04L 67/34* (2013.01)

(58) Field of Classification Search
None
See application file for complete search history.

(56) References Cited

U.S. PATENT DOCUMENTS

| | | | | |
|---|---|---|---|---|
| 7,506,309 | B2 * | 3/2009 | Schaefer | G07C 5/008 701/31.4 |
| 2002/0159396 | A1 * | 10/2002 | Carlson | H04L 1/1848 370/252 |
| 2004/0168191 | A1 * | 8/2004 | Jerding | H04N 5/44543 725/52 |
| 2010/0036911 | A1 * | 2/2010 | Sankaran | H04L 41/0813 709/204 |
| 2010/0191835 | A1 | 7/2010 | Mehta et al. | |
| 2011/0125521 | A1 * | 5/2011 | Dhoble | G06F 19/3456 705/2 |
| 2014/0108384 | A1 * | 4/2014 | Mule | H04L 41/0843 707/722 |
| 2014/0189170 | A1 * | 7/2014 | Takigawa | G06F 13/12 710/40 |

(Continued)

OTHER PUBLICATIONS

PCT International Search Report and Written Opinion dated Jan. 28, 2020, for PCT International Application No. PCT/US19/53357, 10 pages.

*Primary Examiner* — Joshua Joo
(74) *Attorney, Agent, or Firm* — Lee & Hayes, P.C.

(57) ABSTRACT

A technique for receiving a configuration setting update at a networked endpoint device involves receiving a data packet from a head-end device, including one or more parameter updates that each include a parameter identification, a designated parameter value, and a predetermined level assignment for the designated parameter value. The technique further includes updating a record of two or more records of each parameter with its designated parameter value, the two or more records associated with differentiating level assignments defining a prioritized hierarchy of parameter values for the parameter at the endpoint device. The updated record is the record associated with the predetermined level assignment provided in the data packet. A level assignment may be for an individual endpoint, group of endpoints, or as a default, for example. An application may be run at the endpoint device using the parameter value recorded at the highest priority level assignment for each parameter.

22 Claims, 16 Drawing Sheets

(56) References Cited

U.S. PATENT DOCUMENTS

| | | | |
|---|---|---|---|
| 2014/0233573 A1* | 8/2014 | Admon | H04L 69/324 |
| | | | 370/394 |
| 2015/0095468 A1* | 4/2015 | Benny | H04L 41/0853 |
| | | | 709/220 |
| 2015/0186206 A1 | 7/2015 | Bhattacharya et al. | |
| 2016/0057000 A1* | 2/2016 | Piekarski | H04L 41/082 |
| | | | 709/221 |
| 2016/0344588 A1* | 11/2016 | Xie | H04L 63/104 |
| 2017/0177321 A1* | 6/2017 | Seastrom | H04N 21/47202 |
| 2017/0322795 A1* | 11/2017 | DeMaris | H04L 67/10 |
| 2018/0160154 A1* | 6/2018 | Song | H04N 21/2358 |
| 2018/0262593 A1 | 9/2018 | Osterloh et al. | |
| 2019/0095189 A1* | 3/2019 | Feigen | G06F 9/44505 |
| 2020/0014587 A1* | 1/2020 | Cheloff | H04L 41/0803 |
| 2020/0267055 A1* | 8/2020 | Vibhor | H04L 41/0889 |

* cited by examiner

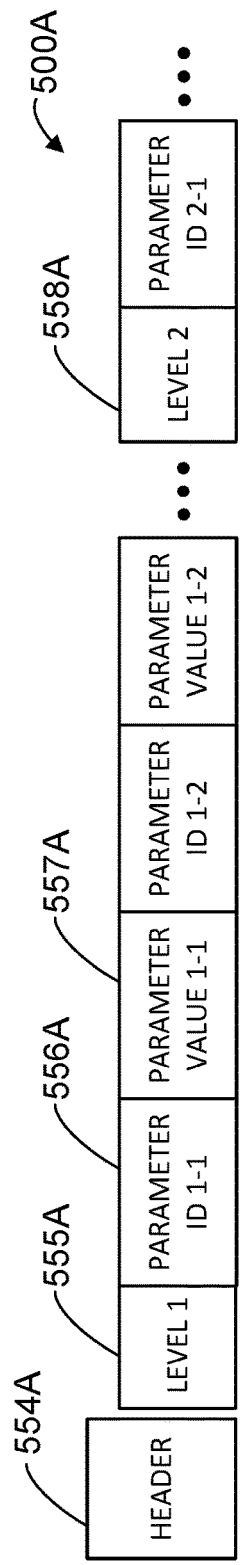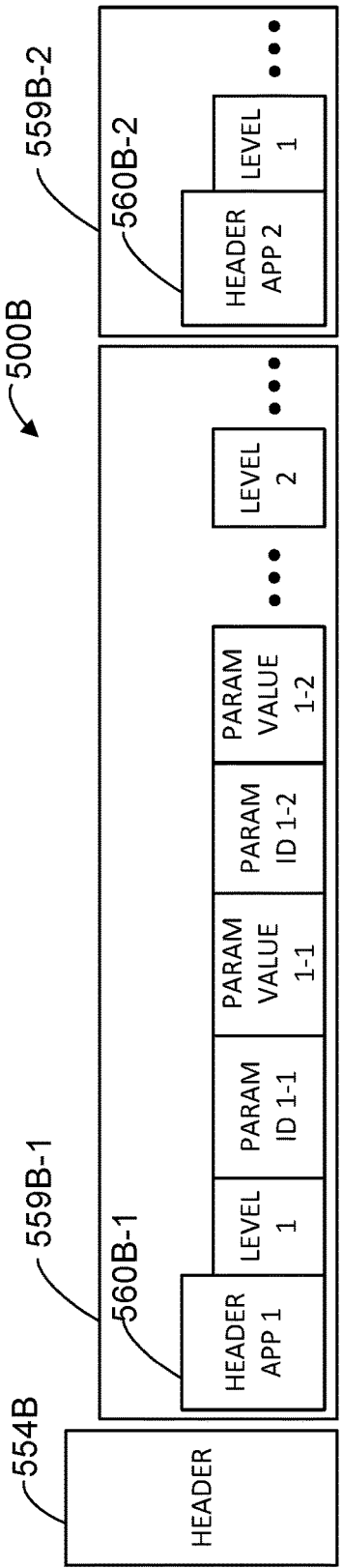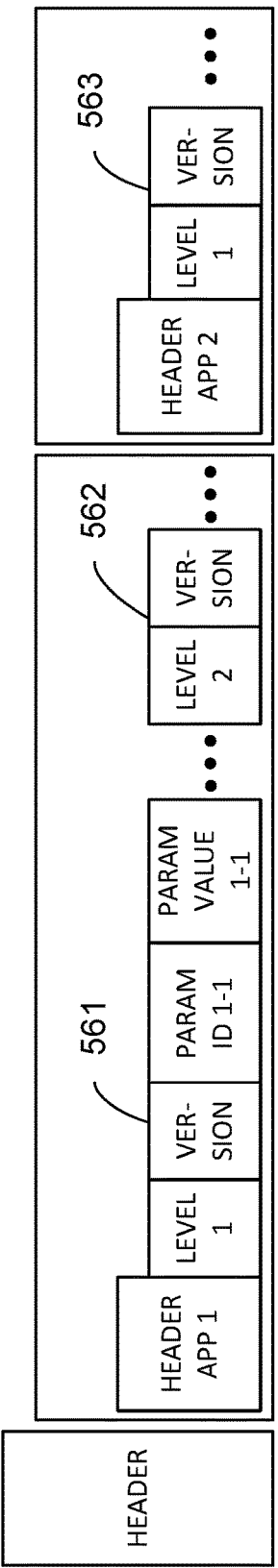

HIERARCHICAL CONFIGURATION OF NETWORKED COMMUNICATION DEVICES

FIELD OF THE DISCLOSURE

This disclosure relates generally to networked communication devices that run one or more applications (and/or agents/features thereof), and more particularly to configuration of same.

BACKGROUND

A computing device may contain software or firmware capable of executing on a computing device. Such software or firmware may be called an application. Examples of applications may include, for example, and without limitation, an operating system, an update to an operating system, a software program, an update of a software program, an add-on to a software program, a patch, a plugin, a driver, a firmware image, a firmware update, etc. Networked computing devices (e.g., endpoint (or node) devices, head-end devices, etc.) may contain and run one or more applications, and/or may run one or more features (e.g., applets) or agents (e.g., a plurality of features) that are associated with one or more primary applications that may be run on one or more networked host devices (e.g., an application server that may be in communication with endpoint devices and/or head-end devices over a network such as the Internet). Networked computing devices may run a single application or a plurality of applications (or may run one or more agents or features associated with a single primary application or a plurality of primary applications).

When agents (or features) associated with primary applications are run on an endpoint device, the agents (or features) may, among other things, collect information provided by the endpoint device or a sensor associated with the endpoint device, the data including, for example, data reads associated with the endpoint device, data associated with the environment in which the endpoint device (and sensor) is located, location-awareness information, etc., or any other type of data associated with the endpoint device. The collected information may then be transmitted over the network to the head-end device(s) and/or to host device(s) running the associated primary application for analysis and/or processing. Each agent or feature may provide a different type of information associated with, or needed by, its associated primary application. In some cases, agents or features may be located/run at a networked computing device that is associated with programs other than primary applications running on a networked host device (e.g., software updates, firmware updates, configuration applets, etc.).

Typically, for the same type of endpoint devices in a given network, the endpoint devices likely run one or more of the same applications (and/or one or more of the same agents/features associated with the same primary application(s)). For proper operation of the application(s) (or associated agent(s)/feature(s)), the endpoint devices need to be configured with configuration settings or parameters respectively associated with the application(s) (or associated primary applications, if applicable). The configuration settings may be adjustable or updateable. Therefore, once configured, one or more endpoint devices may have configuration parameters that need to be updated. The delivery of configuration parameters to these endpoint devices, including configuration parameter updates, may be accomplished over the network. This can be done by unicast messaging the needed configuration parameters (and/or updates) to each endpoint device. However, sending configuration parameters in individual transmissions to each endpoint device is costly and inefficient. For example, network bandwidth (e.g., radio frequency (RF) bandwidth) is limited. Multicasting the configuration parameters/updates may seem like an obvious means of reducing network bandwidth consumption. Using multicast messaging ideally could deliver identical configuration information to the endpoint devices. However, there are complications to consider. For example, it is possible that one or more endpoint devices may require different configurations than other endpoint devices, even those using the same application(s), agent(s), or feature(s). Further, data packet drop rates may be relatively high, and there may be no guaranteed delivery. Thus, multiple multicasts may end up being needed, further increasing bandwidth consumption. For at least these reasons, a solution to deliver the needed configuration parameters to endpoint devices over a network while minimizing the amount of network traffic necessary to do so is desired.

BRIEF DESCRIPTION OF THE DRAWINGS

FIGS. 5A-5C depict example data packet constructions that may be sent to provide a configuration update to one or more endpoint devices, according to embodiments of the present disclosure.

Figure 1:
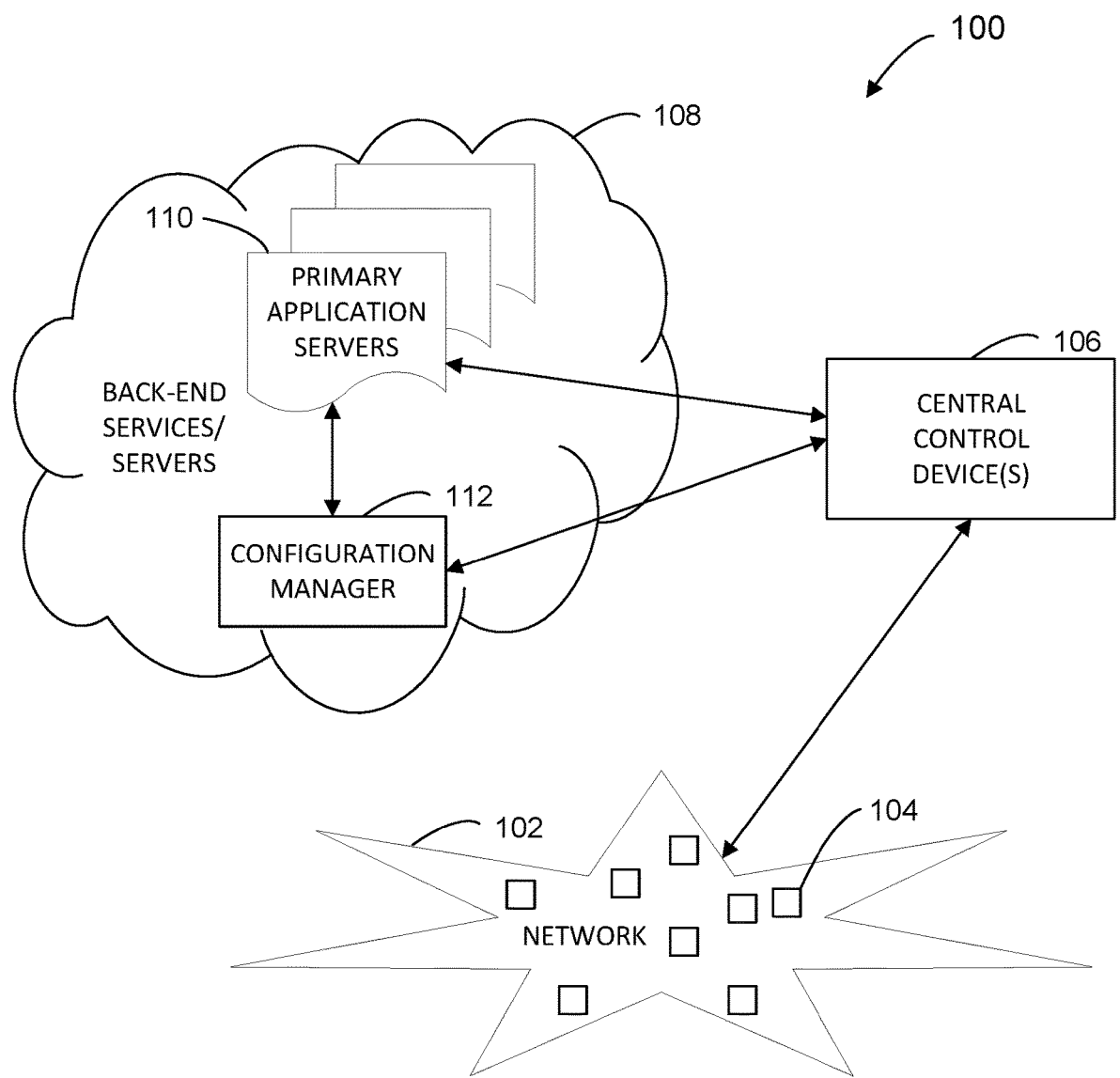
FIG. 1 is a high-level diagram depicting an example communication environment including a network of endpoint devices, central control devices, and back-end services/servers, according to embodiments of the present disclosure.

In the drawings, the leftmost digit(s) of a reference number may identify the drawing in which the reference number first appears.

DETAILED DESCRIPTION

The description herein discloses techniques and solutions that may be used to efficiently provide configuration parameters and updates to one or more networked endpoint devices while minimizing the amount of network bandwidth used, and also simplifying an administrator's task of managing configuration parameters for a large number of endpoint devices.

Embodiments are now described with reference to the figures, where like reference numbers may indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that the technology disclosed herein can also be employed in a variety of other systems and implementations other than what is described herein.

FIG. 1 is a high-level diagram depicting an example communication environment 100 including a network 102 of endpoint devices 104, central control device(s) 106, and one or more back-end servers 108, in accordance with embodiments of the present disclosure. Network 102 of endpoint devices 104 may be configured as a mesh network, a star network, or any kind of network, wired or wireless. Back-end servers 108 may include service-providing servers running at one or more service provider locations, running in the cloud, etc. One or more applications used by central control device(s) 106 and/or endpoint devices 104 may be located in (and may be downloadable from) one or more primary application servers 110, which may be part of the one or more back-end servers 108. It should be noted that, while an endpoint device or a computing device at central control 106 (e.g., a head-end device) may run one or more agents or features associated with a primary application, the term "application" (as opposed to "primary application") is used generally from here forward to represent an application, or agent(s) or feature(s), associated with a primary application, at an endpoint device or head-end device.

For an application to be properly run at an endpoint device 104, one or more configuration parameters may need to be set at the endpoint device. A configuration manager 112 may also be present in environment 100 (e.g., as part of the one or more back-end servers 108) and may be used to keep a record of configuration parameters that are currently set at each endpoint device 104, to allow primary application servers 110 to access configuration states, to determine and/or provide configuration differences (e.g., in binary) that may be loaded and pushed down to endpoint devices 104, and/or to keep a record of configuration parameter groups (discussed in further detail below).

Figure 2:
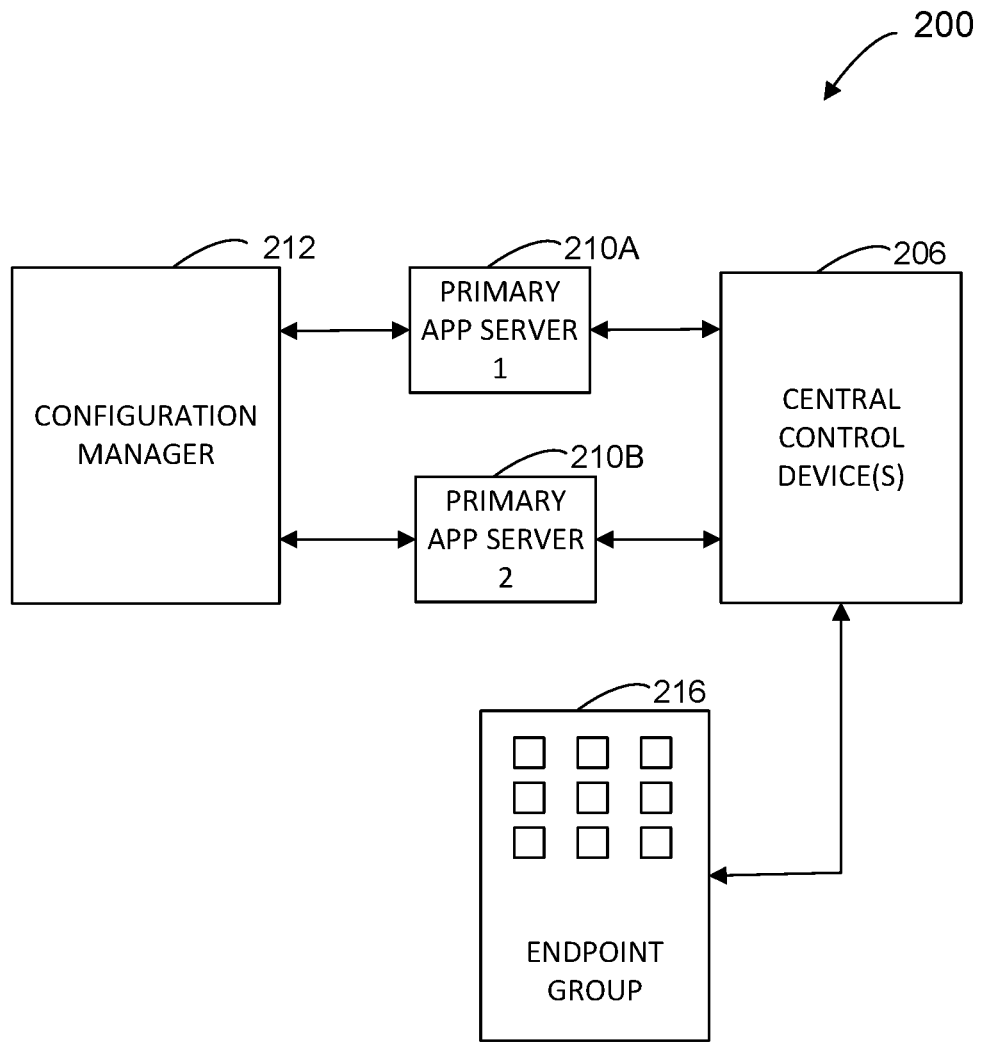
FIG. 2 is a block diagram illustrating components of an example communication environment and an example configuration update flow, according to embodiments of the present disclosure.

FIG. 2 is a block diagram illustrating components of an example communication environment 200 and an example configuration update flow, according to embodiments of the present disclosure. Configuration manager 212 may store one or more configurations applicable to one or more applications (which may include applications associated with example primary application servers 210A and/or 210B) for use on one or more endpoint devices. Configuration manager 212 may store configurations according to hierarchy levels (e.g., default configurations, group configurations, endpoint-specific configurations, etc., as described in more detail below). Primary application servers 210A and/or 210B running one or more associated primary applications may provide configuration parameters to configuration manager 212 for storage. For example, when a primary application server 210A or 210B desires to update one or more parameters, primary application server 210A or 210B may specify the level that the parameter update is to be made, the group(s) to which the update applies (if applicable), the subset of endpoint devices to which the update applies (if applicable), etc., and may submit the update information to configuration manager 212. A primary application server (e.g., primary application server 210A or 210B), in conjunction with configuration manager 212, may provide the desired configuration to central control device(s) 206 to provide to the appropriate endpoint device(s). The provided configuration may include a full set of configuration data for a given application. In an embodiment, an application server, in conjunction with the configuration manager 212, may determine a difference, or delta, between a current configuration and a desired configuration and may provide the delta configuration to central control device(s) 206 to provide to the appropriate endpoint devices, as further discussed below. In an embodiment, configuration manager 212 may manage configurations per application (e.g., not mixing configurations among applications). In other embodiments, configurations may be managed for multiple applications (e.g., applications that may share parameters).

Configuration parameter updates may be sent to individual endpoint devices as unicast messages. To save time and network bandwidth, for updates to be made on two or more endpoint devices, configuration parameter updates may be multicast to a predetermined group of endpoint devices, such as endpoint group 216. Groups of endpoint devices for configuration purposes may be defined and/or managed by primary application servers 210 and/or central control device(s) 206 and/or configuration manager 212. The defining characteristics of a group may include, for example, but are not to be limited to, one or more of endpoint devices in a specific geographic area, elevation, etc.; endpoint devices supplied by a common feeder; endpoint devices supplied by phase A (or B or C) of a three-phase transformer; endpoint devices that are supplied by the same model transformer; endpoint devices that run a particular common application; endpoint devices that have one or more characteristics in common; etc. A defined endpoint device group may be stored by primary application servers 210 and/or central control device(s) 206 and/or configuration manager 212. Management of group configuration is further described with reference to FIG. 3.

Figure 3:
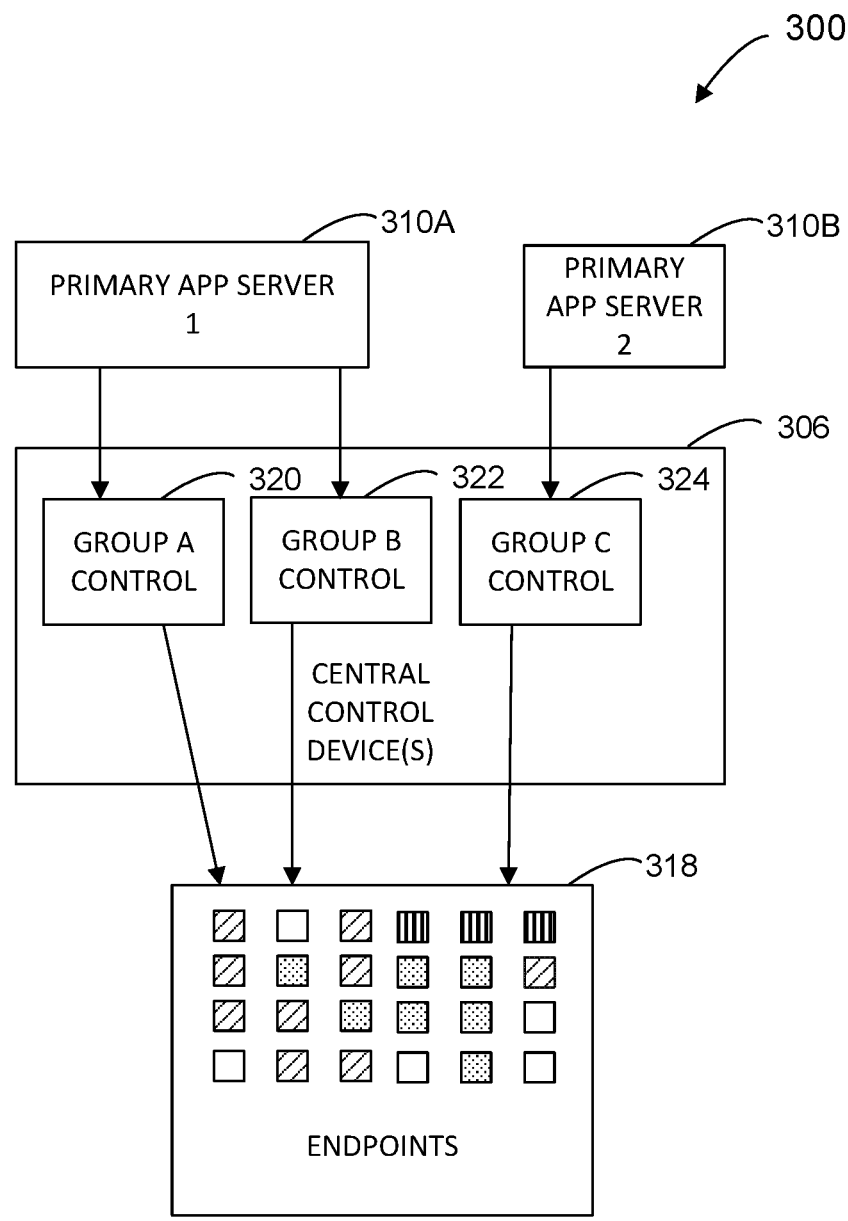
FIG. 3 is a block diagram depicting an example flow of control for configuration updates to various groups of endpoint devices, according to an embodiment of the present disclosure.

FIG. 3 is a block diagram depicting example components of an example communication environment 300 and flow of control for configuration updates to various groups of endpoint devices, according to an embodiment of the present disclosure. An application server, such as example primary application server 310A or 310B, may send a request to central control device(s) 306 to create a group of specific endpoint devices. Central control device(s) 306 may create the requested group and establish a multicast address for the group. The multicast address may be used to send a multicast message to all the endpoint devices of that created group. While the multicast message may be heard (e.g., received) by a plurality of endpoint devices, the message may be ignored by those that are not associated with the designated address, but may be passed on to other endpoint devices in the network. When central control device(s) 306 creates a group, configuration manager 212 (shown in FIG. 2) may mirror the created group by tracking the same group with respect to parameter configurations.

In the example shown in FIG. 3, an application associated with primary application server 310A may be associated with two configuration groups of endpoint devices, group A and group B. Likewise, an application associated with primary application server 310B may be associated with one configuration group of endpoint devices, group C. Central control device(s) 306 may be requested by primary application server 310A to create groups A and B, establishing group A control 320 and group B control 322, including establishing a multicast address for each group A and B. Likewise, central control device(s) 306 may be requested by primary application server 310B to create group C, establishing group C control 324, including establishing a multicast address for group C. As can be seen by the keyed designs of endpoint devices 318, one or more endpoint devices may be assigned to at least one of the established groups.

While, in the example shown in FIG. 3, an endpoint device is shown to be assigned to only one group (or to no group), it is possible for an endpoint device to be assigned to two or more groups. In an embodiment, when an endpoint device is assigned to two or more groups, each of the groups may be prioritized according to its level, as further discussed below. In an embodiment, when an endpoint device is assigned to two or more groups, additional configuration parameters may be used to establish parameter priority for when there may be a configuration parameter conflict. In another embodiment, an application at an endpoint device may be enrolled in multiple configuration groups, by means of employment of arbitration guidelines. These guidelines may ensure that no conflict will result if two groups associated with the same application attempt to manipulate the same parameter. The first guidelines may specify that the groups be assigned different configuration levels (e.g., as described later with reference to FIG. 6). Should the first guidelines be violated (e.g., an administrator creates two groups for the same application at the same configuration level), then these two groups may be limited as to which parameters each of the groups may update. For example, a limitation may be established that any single parameter cannot be updated by two groups at the same level. In other words, in this embodiment, only one group may 'own' that parameter for a given level.

Figure 4:
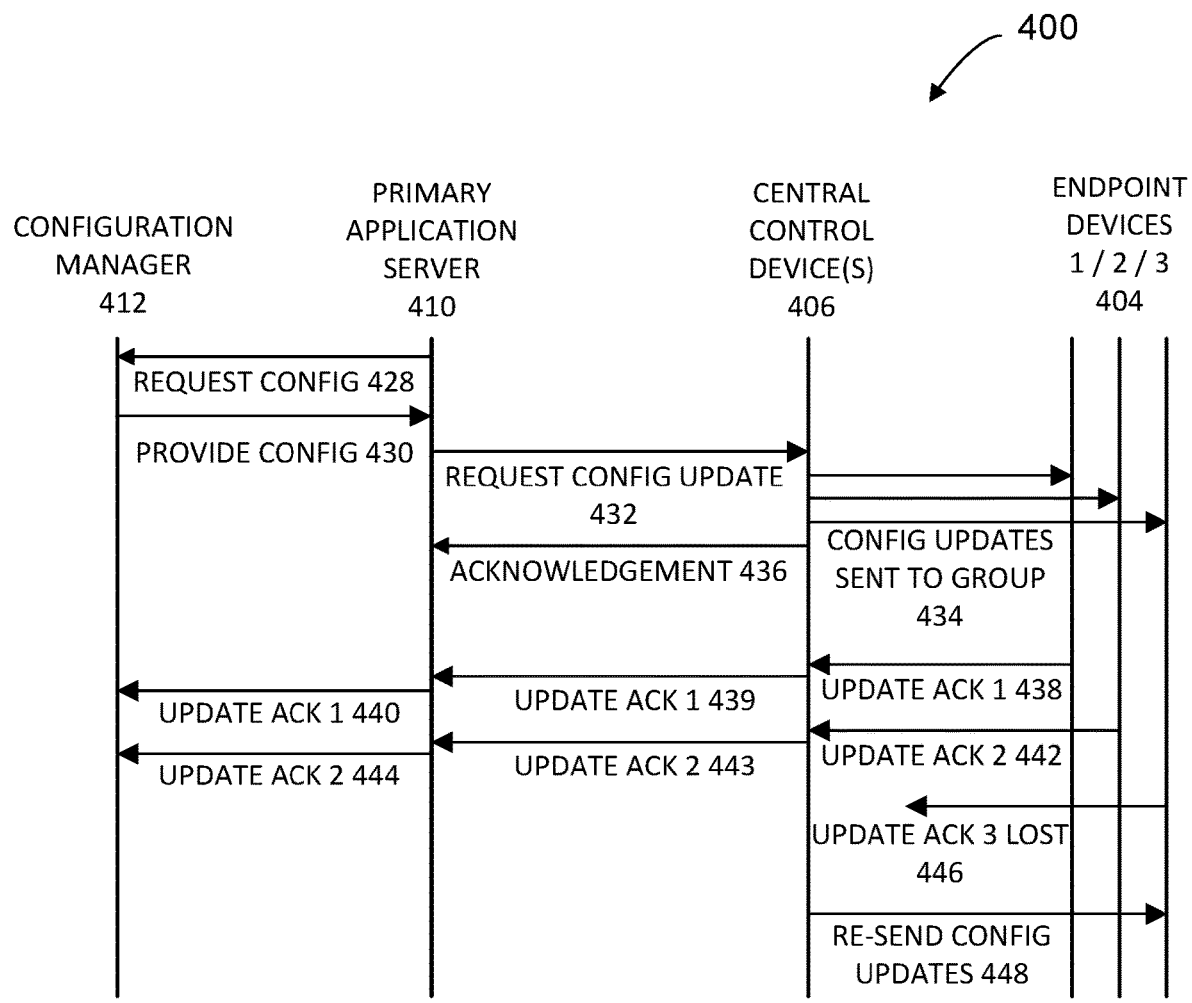
FIG. 4 is a sequence diagram illustrating an example of configuration update communications, according to an embodiment of the present disclosure.

FIG. 4 is a sequence diagram 400 illustrating an example of configuration update communications, according to an embodiment of the present disclosure. A primary application server 410 may send a request for a configuration 428 to configuration manager 412, the request requesting a configuration of one or more endpoint devices 404. Configuration manager 412 may send the requested configuration information 430 to primary application server 410. Primary application server 410 may send a request for a configuration update 432 for the one or more endpoint devices 404 to a head-end device (e.g., central control device(s) 406). Central control device(s) 406 may send the configuration updates 434 to a specified group of endpoint devices 404. Central control device(s) 406 may send an acknowledgement 436 to the requesting primary application server 410 that the configuration updates were sent. Endpoint devices 404 that receive the configuration update may send an acknowledgement back to central control device(s) 406, which may also send the acknowledgement on to primary application server 410 and/or configuration manager 412. In this example, a first endpoint device (e.g., endpoint device 1) in the group that was sent the update may send an acknowledgement 438 to central control device(s) 406, and central control device(s) 406 may send an acknowledgement 439 to primary application server 410 that the first endpoint device has received the configuration update. An acknowledgement of receipt 440 may then also be sent on to configuration manager 412 for accurate configuration tracking. Likewise, a second endpoint device (e.g., endpoint device 2) in the group that was sent the update may send an acknowledgement 442 to central control device(s) 406, and central control device(s) 406 may send an acknowledgement 443 to primary application server 410 that the second endpoint device has received the configuration update. An acknowledgement of receipt 444 may then also be sent on to configuration manager 412 for accurate configuration tracking. In the event that an acknowledgement of receipt is not received by central control device(s) 406 (e.g., if an endpoint device does not receive the configuration update or if it receives it but an acknowledgement (such as acknowledgement 446 from endpoint device 3) gets lost or becomes corrupted), central control device(s) 406 may send the configuration updates again 448 (e.g., via unicast to the endpoint devices from which an acknowledgement was not received, via multicast to a group of endpoint devices from which an acknowledgement was not received, or via multicast to the entire original group again, etc.). An acknowledgement message from an endpoint device may also indicate an error in receiving a configuration update, in response to which the configuration update may be resent. In an embodiment, the sending of an acknowledgement is postponed until one or more other messages are to be sent to the head-end device (e.g., central control device(s) 406) in order to conserve network bandwidth. In this way, the acknowledgement and the other messages may be combined into the smallest, or minimal, number of transmissions.

FIGS. 5A-5C depict example data packets 500A, 500B, and 500C that may be sent to provide a configuration update to one or more endpoint devices, according to embodiments of the present disclosure. For example, data packet 500A may be sent from central control device(s) 406 to endpoint devices 404 (at 434, FIG. 4). Data packet 500A may include a header 554A, which may contain address information (e.g., for a specific endpoint device, for a group of endpoint devices, etc.), and may contain other information, as would be understood by those of ordinary skill in the art. Data packet 500A may also include parameter update information for one or more parameters for use by an application at the endpoint device(s). For example, header 554A may indicate the number of hierarchical configuration levels (further discussed below starting with reference to FIG. 6) included in the data packet as well as the number of parameter update sets included for each level. In the example shown, data packet 500A may contain, for each predetermined hierarchical configuration level of an application (e.g., level 555A, level 558A, etc.), one or more sets of parameter update information, including for example, at least a parameter identification (e.g., parameter ID 556A) and a parameter value (e.g., parameter value 557A) for each parameter to be updated (or for all parameters of an application if providing a full configuration update). While only two levels and three parameters are shown, data packet 500A may contain additional levels and corresponding parameter update sets.

Parameter identification (e.g., parameter ID 556A) may indicate a parameter identifier or name. In embodiments where there are more than one application (or agent or feature) at an endpoint device, a parameter identification may also indicate the application(s) to which the parameter is applicable, or, as an alternative, the data packet may include an additional data item (e.g., an application indication, not shown) that indicates the applicable application for the parameter updates. (In embodiments where there is only one application (or agent or feature) at the endpoint device, identifying the application (or agent or feature) may not be necessary.) Parameter value (e.g., parameter value 557A) may indicate a new value (or a desired value) for the parameter. Hierarchical configuration level assignment 555A may indicate a level assignment for the desired parameter values following the level assignment, which will be described in further detail below.

Data packet 500B is an example of a configuration update data packet that includes parameter updates for more than one application, according to an embodiment of the present disclosure. Data packet 500B may include a header 554B and subpackets (e.g., subpacket 559B-1, subpacket 559B-2, etc.), each subpacket containing parameter update information for corresponding applications. Header 554B may contain address information (e.g., for a specific endpoint device, for a group of endpoint devices, etc.), and may contain other information, as would be understood by those of ordinary skill in the art. Header 554B may also contain the number of application-specific subpackets included in data packet 500B. Each subpacket (e.g., subpacket 559B-1, subpacket 559B-2, etc.) may include its own header (e.g., header 560B-1, header 560B-2, etc.) followed by parameter update information for one or more parameters for use by an application at the endpoint device(s), similar to that described with reference to data packet 500A. While only two application subpackets are shown, data packet 500B may contain additional subpackets, and each subpacket may contain any number of levels and corresponding parameter update sets.

Data packet 500C is another example of a configuration update data packet that includes parameter updates for more than one application, according to an embodiment of the present disclosure. Data packet 500C is similar to data packet 500B, except that, for each hierarchical configuration level assignment, a version is indicated (e.g., version indication 561 for level 1 of application 1, version indication 562 for level 2 of application 1, version indication 563 for level 1 of application 2, etc.). The version indications for each level for each application further helps in identifying parameter setting inconsistencies across endpoint devices, and allowing for their expedient correction. Using this version information, a configuration version check may be conducted to determine if a parameter configuration update needs to be made, as will be discussed further below.

Data packets 500A/B/C may also include a tag identifier (not shown) that may identify a configuration update data packet and may also indicate a placement in an order of configuration update data packets. When the tag identifier for the data packet indicates that the data packet is out of order such that a previously received data packet is a more recent configuration update, the present data packet may be ignored by a receiving endpoint device.

Data packets A/B/C are only three examples of data packet constructions that may be used for configuration updates as described herein. As one of ordinary skill in the relevant art(s) would recognize, many other data packet constructions may be used.

Figure 6:
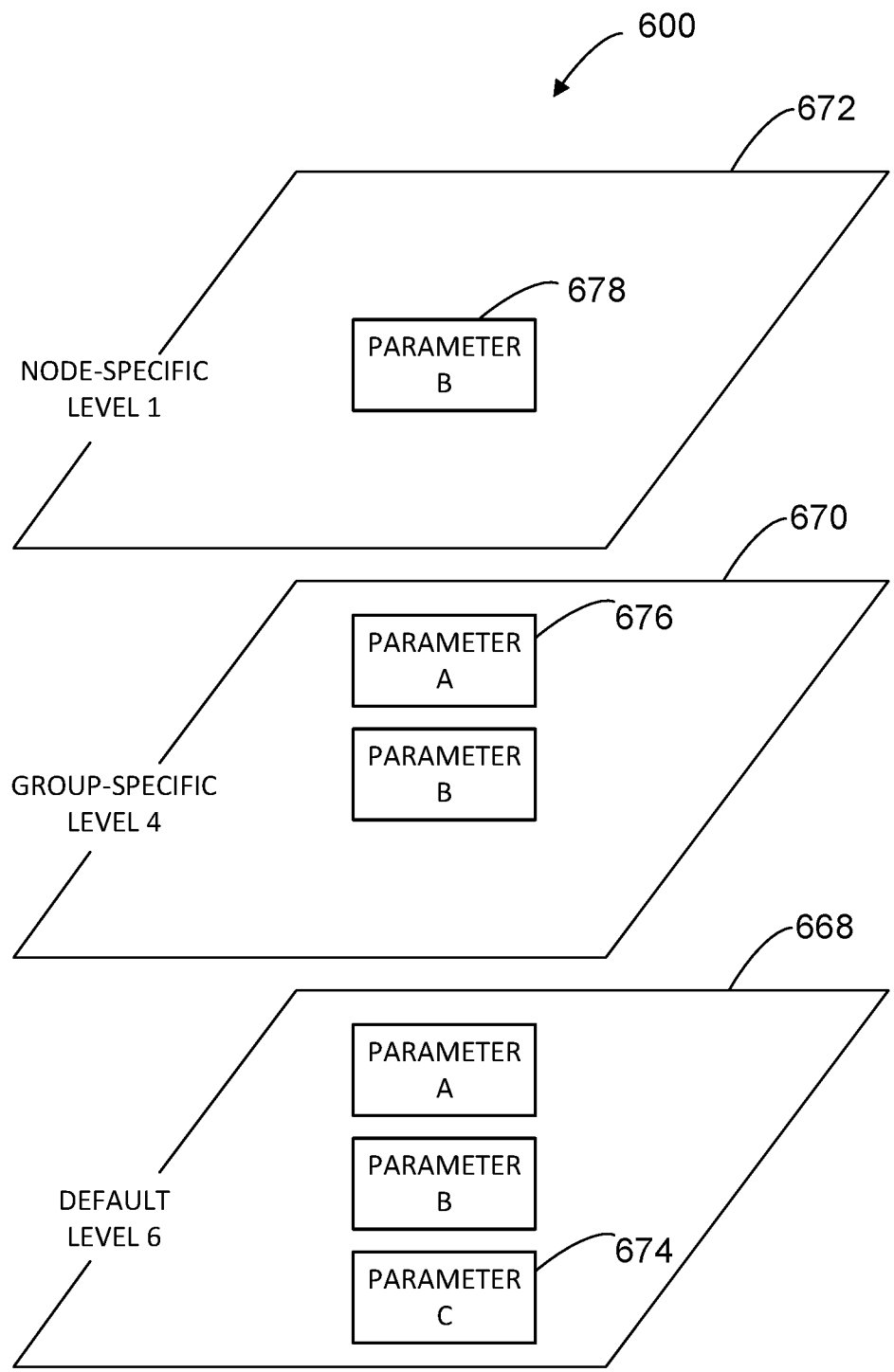
FIG. 6 illustrates an example of hierarchical parameter settings for an endpoint device, according to an embodiment of the present disclosure.

FIG. 6 illustrates an example of hierarchical parameter settings for an application (or agent or feature) at an endpoint device, according to an embodiment of the present disclosure. An endpoint device may maintain its configurations in a hierarchy (e.g., hierarchy 600 as shown in FIG. 6). The hierarchy allows configuration parameters to be maintained at differing levels. While any number of levels may be used, the example shown in FIG. 6 includes three levels: a default level 668, a group-specific level 670, and a node-specific level 672. Default level parameters 668 may include parameters set as default parameters at an endpoint device. The default level may provide a default for all parameters of a given application, so that there may be a value to which a parameter will default if no other levels are utilized. In an embodiment, all endpoint devices that use a given application/agent/feature may be provided with default parameters (e.g., upon manufacturing, during application installation, via a received data packet such as data packet 500A/B/C of FIG. 5A/B/C, etc.). In an embodiment, if provided in a data packet, each default parameter may be presented by providing its parameter identification (in this example, parameter A, B, C, etc.), its assigned parameter value, and a hierarchical level assignment for the parameter that indicates that it is a default-level parameter. In hierarchy 600, the default level is designated as level 6.

Group-specific parameters 670 may include parameters provided to a specified group of endpoint devices (e.g., devices of a specific type, of a specific region, etc.). In an embodiment, one or more group-specific parameters 670 may be provided to an endpoint device as an update via a received data packet such as data packet 500A/B/C of FIG. 5A/B/C, where the data packet 500A/B/C may be addressed to the group. In the data packet, the hierarchical level assignment for the group-specific parameters may be designated for the specified group. In hierarchy 600, the group-specific level is designated as level 4.

Node-specific parameters 672 may include parameters provided to a specific endpoint device. In an embodiment, one or more node-specific parameters 672 may be provided to an endpoint device as an update via a received data packet such as data packet 500A/B/C of FIG. 5A/B/C, where the data packet 500A/B/C may be addressed to the endpoint device. In the data packet, the hierarchical level assignment for the node-specific parameters may be designated for the specified endpoint device. In hierarchy 600, the node-specific level is designated as level 1.

In hierarchy 600, the hierarchical level assignments shown are 1 (node-specific), 4 (group-specific), and 6 (default). Additional level assignments (e.g., 2, 4, 5, 7, and higher) may be additional levels that are currently being used (though not shown here), or may be levels that are reserved for future use if needed (e.g., for additional groups in which an endpoint device may become enrolled, etc.).

In an embodiment, the actual parameter value to be used by an application/agent/feature is the parameter value existing at the highest level at the particular endpoint device (with level 1 being the highest of the levels). In hierarchy 600, with regard to parameter C—default parameter C (parameter 674) would be used, with regard to parameter A—group-specific parameter A (parameter 676) would be used, and with regard to parameter B—node-specific parameter B (parameter 678) would be used, since these values are the highest existing values set for parameters A, B, and C.

In an embodiment, in order to update, for example, parameter A for a specific endpoint device having example hierarchy 600 of FIG. 6, where the new parameter A is different from the current group-specific parameter A and is specific to the endpoint device, an update may be made via a received data packet such as data packet 500A/B/C of FIG. 5A/B/C, where in the data packet the parameter identification designates parameter A, the hierarchical level assignment designates the node-specific level (e.g., level 1), and the parameter value is the new desired value. In another example starting with hierarchy 600 as shown in FIG. 6, to downgrade a hierarchical level (e.g., if it is desired to use default parameter A instead of group-specific parameter A for a group of endpoint devices, or if the endpoint device is removed from the group associated with level 4), group-specific parameter A (parameter 676) may be removed at the endpoint device. In an embodiment, this may be accomplished by an update via a received data packet such as data packet 500A/B/C of FIG. 5A/B/C, where in the data packet the parameter identification designates parameter A, the hierarchical level assignment designates the group-specific level (e.g., level 4), and the parameter value is null. A purpose of the null value is to remove a parameter setting at that level altogether. This would result in the highest level for existing (non-null) parameter A now being at default level 6.

Figure 7A:
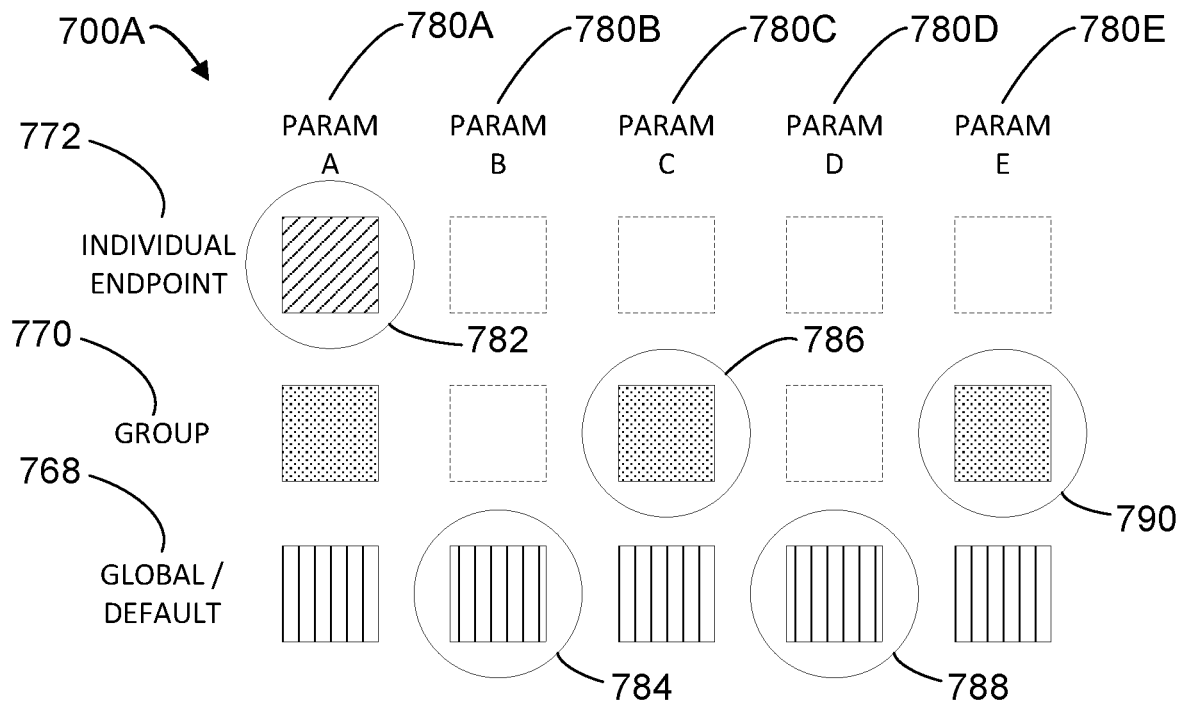
FIGS. 7A and 7B depict another example of hierarchical parameter settings for an endpoint device, according to an embodiment of the present disclosure.
Figure 7B:
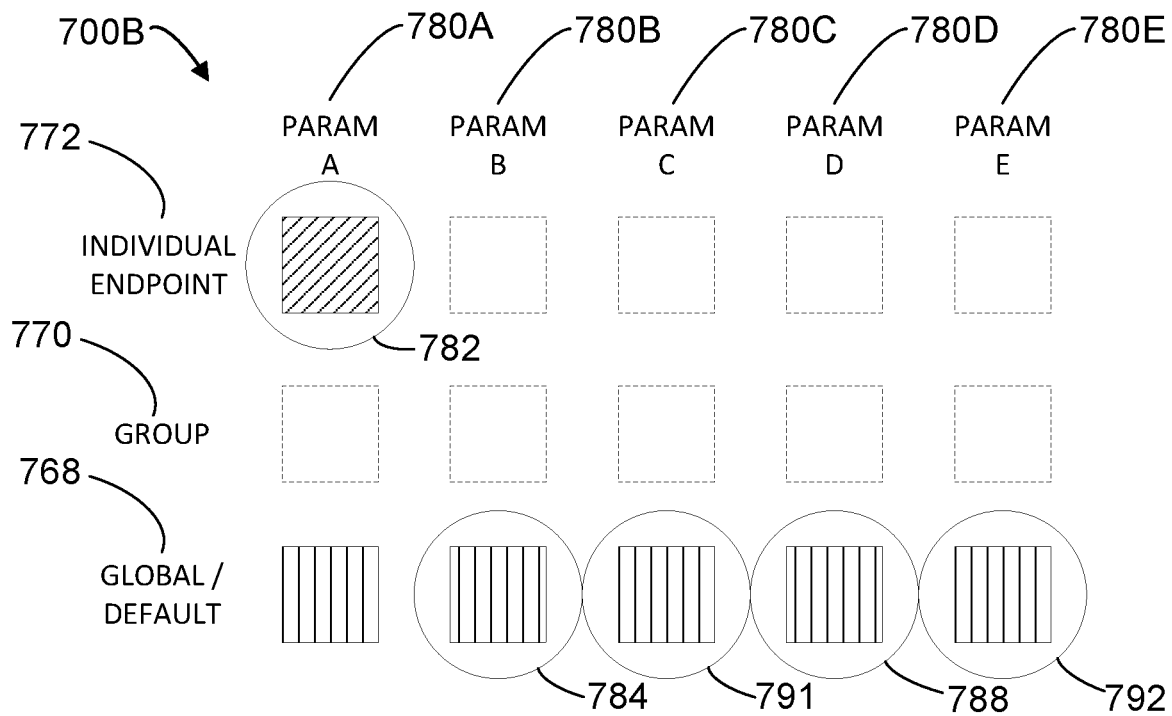

FIGS. 7A and 7B depict another example of hierarchical parameter settings for an endpoint device, according to an embodiment of the present disclosure. Example 700A/B is another way, in addition to the example in FIG. 6, to view the hierarchical parameter settings to assist in understanding their use. In example 700A/B, there are at least five parameters set (780A-780E) for this particular endpoint device application (referenced as endpoint device X for this discussion of FIGS. 7A/7B), and at least three level assignments for each parameter (global/default 768, group 770, and individual 772). In example 700A, parameter 780A has parameter settings at the global/default level 768, the group level 770, and the individual endpoint level 772. Since a value for parameter 780A exists at the highest prioritized level (individual endpoint level 772), an application/agent/feature that uses parameter 780A at endpoint device X will use the parameter value set at individual endpoint level 772 (i.e., parameter value 782). The values for parameter 780A at the group level 770 and global/default level 768 would be ignored, though would still be maintained by endpoint device X.

Continuing with this example, parameter 780B has only one parameter setting, and that setting is at the global/default level 768. Therefore, an application that uses parameter 780B at endpoint device X will use that parameter setting (i.e., parameter value 784). Parameter 780C has parameter settings at the global/default level 768 and the group level 770. The highest prioritized level at which parameter 780C exists (non-null) is at group level 770. Thus, an application that uses parameter 780C at endpoint device X will use that parameter setting (i.e., parameter value 786). The value for parameter 780C at the global/default level 768 would be ignored, though would still be maintained by endpoint device X. Parameter 780D has only one parameter setting, and that setting is at the global/default level 768. Therefore, an application that uses parameter 780D at endpoint device X will use that parameter setting (i.e., parameter value 788). Parameter 780E has parameter settings at the global/default level 768 and the group level 770. The highest prioritized level at which parameter 780E exists is at group level 770. Thus, an application that uses parameter 780E at endpoint device X will use that parameter setting (i.e., parameter value 790). The value for parameter 780E at the global/default level 768 would be ignored, though would still be maintained by endpoint device X.

The parameter values that are set for an endpoint device may be updated, or parameter values may be added, via a received data packet such as data packet 500A/B/C of FIG. 5A/B/C, for example, as discussed earlier herein. As discussed above, an endpoint device may receive parameter updates by level. To do this, the received data packet may include the parameter (and the applicable application if needed), the assigned value, and also the level to which the parameter update is to be applied. The parameter update may be saved and maintained at that level (until updated again), even if there is a parameter value already present at a higher priority level in place for that parameter. Parameter values may be removed in a similar way (via a received data packet such as data packet 500A/B/C) by designating a parameter value of "null," as discussed above.

Having a hierarchical configuration capability as described herein allows for one or more parameters to be updated for all endpoint devices, for a group of endpoint devices, or even for just one endpoint device, without having to provide a full set of configuration parameters. This capability is especially useful in the definition of groups. If an endpoint device is enrolled in a group, it can easily be provided with the parameters relevant to that group (e.g., group level parameter values for that group). Similarly, if an endpoint device is removed from a group, the group level parameter values may be efficiently removed at that endpoint device. An example of this is shown in FIG. 7B. In this example, endpoint device X may have been removed (e.g., at a head-end device from central control (106/206/306/406)) from the group associated with group level 770. Upon this removal from the group, a data packet may be sent to endpoint device X (e.g., from the head-end device) with parameter updates that may remove (e.g., change to "null") the parameter values associated with the group from which endpoint device X has been removed. The result of this change is shown in FIG. 7B, where the parameter values that did exist at the group level in FIG. 7A have now been removed (i.e., replaced with a null value). In this example, parameter value 782 of parameter 780A continues to be the parameter value used by a using application since it is still the parameter value that is located at the highest priority level of all of the existing parameter values for parameter 780A. Parameter values 784 and 788 (for parameters 780B and 780D, respectively) are still the parameter values used by a using application, as the removal of the group level parameter settings did not affect parameters 780B or 780D. However, for parameters 780C and 780E, the parameter values to now be used are parameter values 791 and 792, respectively, since they are now both the highest priority parameter values that exist for parameters 780C and 780E.

Figure 8:
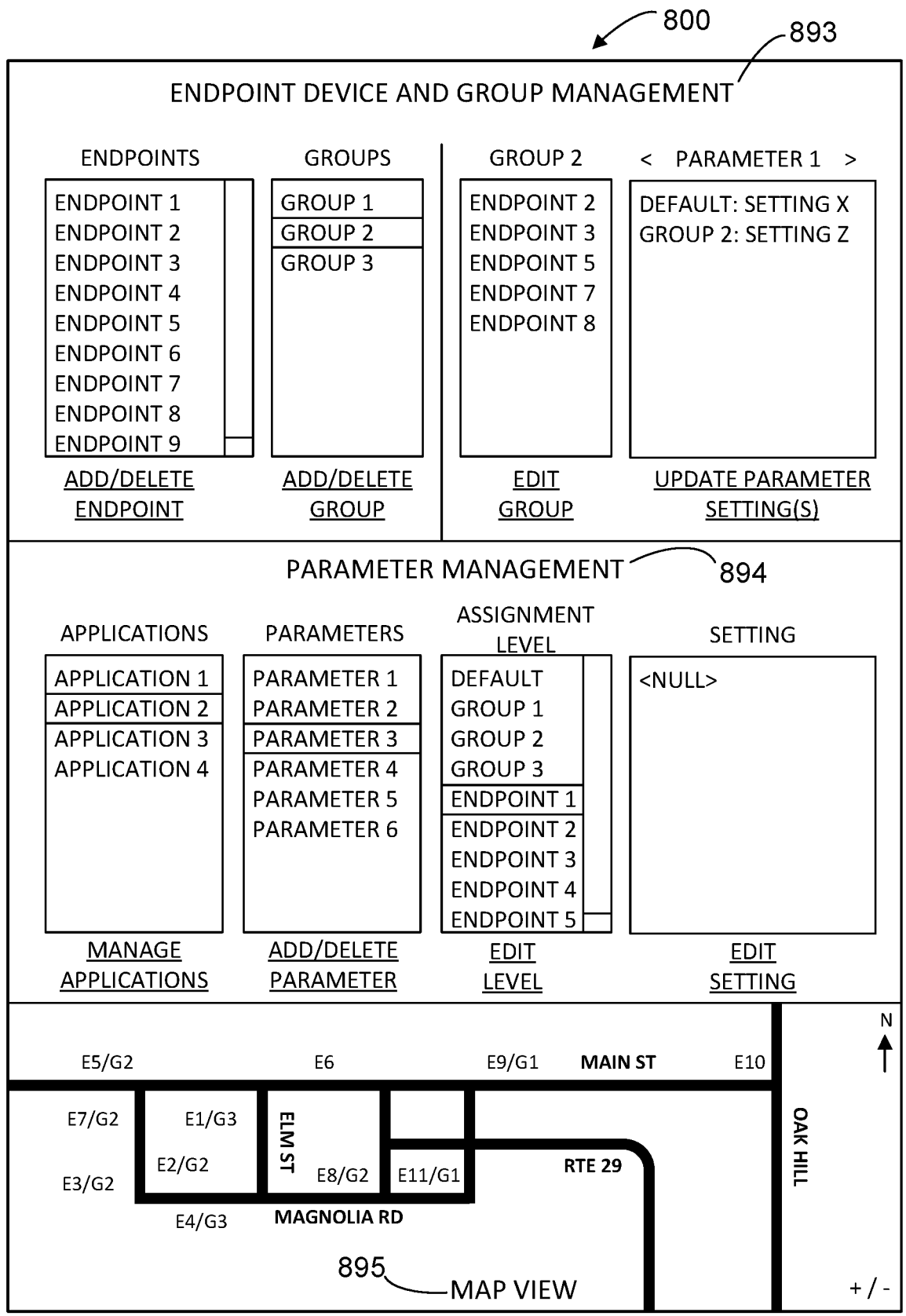
FIG. 8 depicts an example of a user interface screen for managing parameters and configuration settings at endpoint devices, according to an embodiment of the present disclosure.

FIG. 8 depicts an example of a user interface 800 for managing configuration settings at endpoint devices, according to an embodiment of the present disclosure. One or more aspects of example user interface 800 may be used by a central administrator (e.g., using a computing device (head-end device) at central control 106/206/306/406 and/or at configuration manager 112/212/412). User interface 800 may include one or more of various subsections, such as those depicted as (or within) an endpoint device and group management section 893, a parameter management section 894, and/or a map view 895.

Endpoint device and group management section 893 may be used by an administrator to define groups (e.g., enroll or un-enroll endpoint devices from one or more groups), and view or update parameter settings for a selected endpoint device or group. In the example shown, Group 2 is selected, and on the right half of the screen, the endpoint devices assigned to Group 2 are shown, as well as the common parameter values for Parameter 1 for the endpoint devices in Group 2. Functions that may be available to the administrator may include: adding or deleting endpoint devices, adding or deleting groups, editing groups and/or group definitions, changing parameter settings for a specific endpoint device or group, etc. In embodiments, one or more settings defined at central control device(s) 106/206/306/406 may be mirrored at configuration manager 112/212/412, or vice versa.

Parameter Management section 894 may be used by the administrator to manage (e.g., add, delete, edit, etc.), for the various applications, the parameters and their values at each assignment level. In the example shown, for Application 2, the parameter value set for Parameter 3 at the individual assignment level for Endpoint Device 1 is null. Again, in embodiments, one or more settings defined at central control device(s) 106/206/306/406 may be mirrored at configuration manager 112/212/412, or vice versa.

Map view 895 may provide an "aerial"-like view showing the physical topology of the various endpoint devices on a map. The locations of endpoint devices may be obtained in various ways, including the inclusion of global positioning system devices (GPSs) at endpoint devices, recording the latitude/longitude information of endpoint devices upon installation, etc. The map view may be adjustable to zoom in and out for closer or farther perspectives. The map view may show, for one or more endpoint devices, various other types of information relevant to an endpoint device. For example, if the endpoint devices were electricity meters, map 895 could show part of an electric utility company's distribution system overlaid over a geographic area. In another example, if the endpoint devices included solar panels, map 895 could include houses with solar panels pointing in their set directions. In an embodiment, showing corresponding group information along with endpoint device locations on a map may be useful in deciding if an endpoint device needs to be moved to another group (e.g., if a group is defined based on location). From the map view 895, an administrator may be able to visually select endpoint devices (e.g., by clicking on an endpoint device), or even groups of endpoint devices (e.g., by encircling two or more endpoint devices), to view and manage applications and configurations at those endpoint devices via user interface 800.

Figure 9:
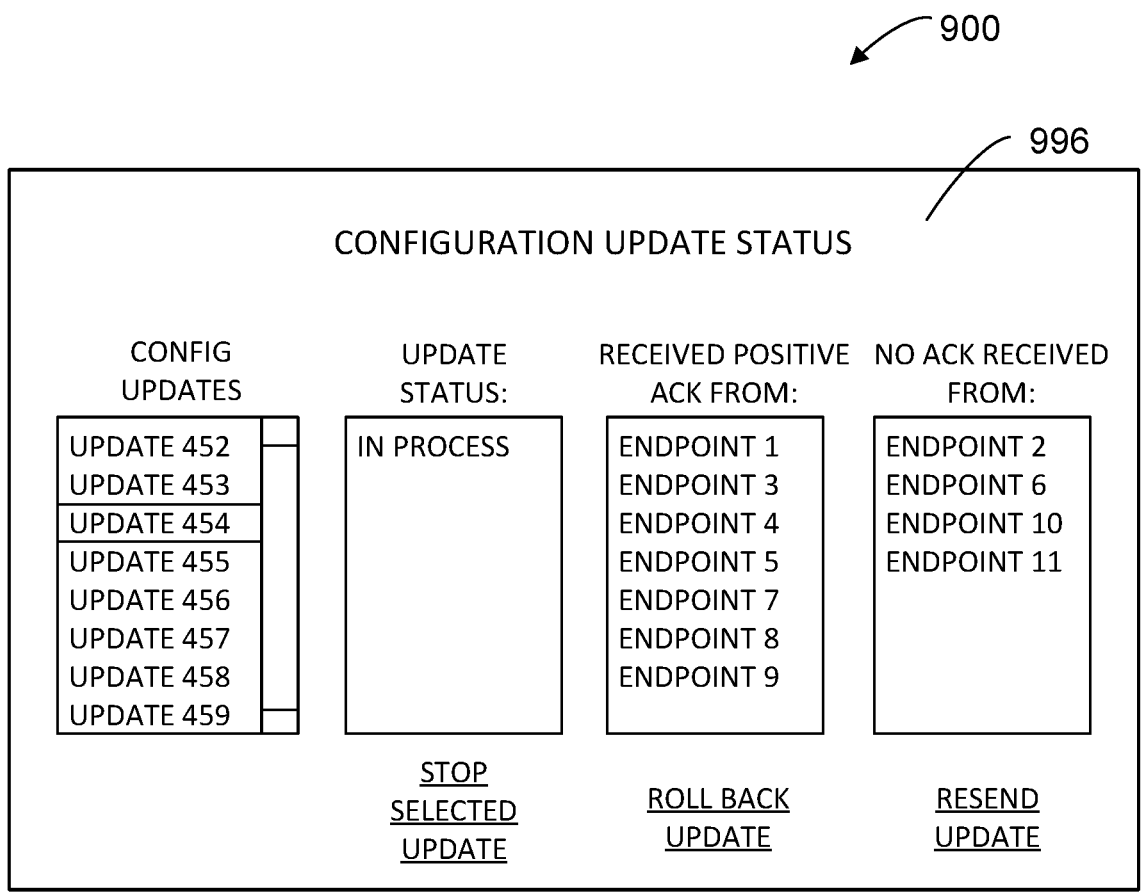
FIG. 9 depicts an example of a user interface screen for viewing configuration update statuses for each update and applicable endpoint devices, according to an embodiment of the present disclosure.

FIG. 9 depicts an example of a user interface screen 900 for viewing configuration update status 996 for each configuration update sent to respective corresponding endpoint devices, according to an embodiment of the present disclosure. When a head-end device (e.g., a computing device at central control 106/206/306/406 and/or at configuration manager 112/212/412) sends a configuration update to one or more endpoint devices, user interface screen 900 can provide (e.g., to an administrator at central control and/or at the configuration manager) information regarding whether or not an acknowledgement of successful receipt has been received back from the endpoint devices to which the configuration update was sent. In the example shown in FIG. 9, for a selected update named "Update 454", an acknowledgement was successfully received from Endpoint Devices 1, 3, 4, 5, 7, 8, and 9, while no acknowledgement was received from Endpoint Devices 2, 6, 10, and 11. In an embodiment, the administrator may choose to proactively command the head-end device (e.g., via user interface screen 900) to resend the update to one or more of the endpoint devices (e.g., to the endpoint devices for which an acknowledgement of successful receipt was not received). In an embodiment, the head-end device may be configured to automatically resend a configuration update to at least the endpoint devices for which an acknowledgement of successful receipt was not received (e.g., after a predetermined time period after the update was initially sent). In an embodiment, the administrator may be given the option to resend the configuration update via multicast or unicast. In an embodiment, an administrator may manually intervene in a configuration update that is currently in process. For example, an administrator may stop a configuration update before completion at one or more endpoint devices to which it was sent (e.g., if there is reason to cancel an update). In an embodiment, an administrator may roll back an update (e.g., to place the updated endpoint devices back to a previous configuration). While example user interfaces 800 and 900 use generic terms to name endpoint devices, groups, parameters, parameter settings, updates, etc., this was done to generally accommodate any implementation for the sake of example. This naming may be customized as appropriate for the implementation for which it is used (e.g., a utility metering system, a street light management system, or any communication system in which sensors and/or communication devices are used).

Figure 10:
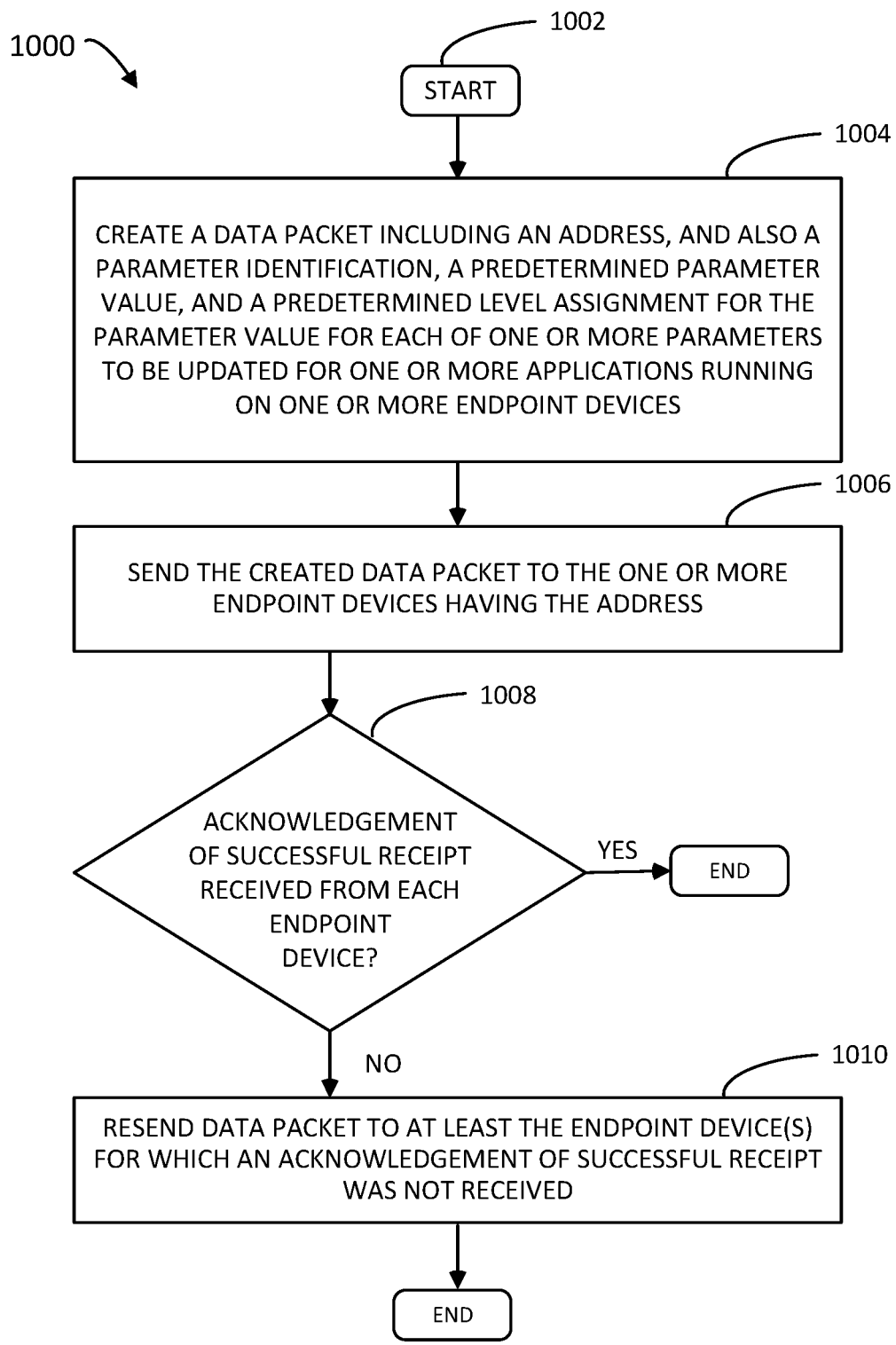
FIG. 10 is a flow diagram illustrating an example process of providing a configuration update to one or more endpoint devices, according to an embodiment of the present disclosure.

FIG. 10 is a flow diagram illustrating an example process 1000 of providing a configuration update to one or more endpoint devices, according to an embodiment of the present disclosure. Process 1000 starts at 1002 and proceeds to 1004. At 1004, a data packet may be created. The data packet may include an address, as well as a parameter identification (and the applicable application if needed), a predetermined parameter value, and a predetermined level assignment for the parameter value, for each of one or more parameters to be updated for one or more applications at one or more endpoint devices. In an embodiment, in order to "remove" the parameter from the designated level assignment, the predetermined parameter value may be "null". At 1006, the created data packet may be sent to the one or more endpoint devices having the address (e.g., via multicast or unicast). At 1008, it may be determined whether an acknowledgement of successful receipt was received from each endpoint device to which the data packet was sent. If yes, the process ends. If no, the process continues at 1010, where the data packet may be resent (via multicast or unicast) to at least the endpoint device(s) for which an acknowledgement of successful receipt was not received. Resending of the data packet may be done automatically (e.g., after a predetermined time period after the data packet was initially sent) or may be in response to an instruction by an administrator, as was discussed above with reference to FIG. 9.

In an embodiment, resending may occur multiple times to increase the likelihood that a configuration update will be received by more endpoint devices. For example, a configuration update data packet may be created and multicast to endpoint devices having the specified address, as in process 1000, and acknowledgements of receipt may be collected. In an embodiment, the acknowledgements of receipt may be collected and recorded over a predetermined time duration. Multicasting the configuration update data packet and collecting/recording of acknowledgements of receipt may continue for a predetermined (or selected) amount of occurrences. In an embodiment, the configuration update data packet may then be unicast to the endpoint device(s) from which an acknowledgement of receipt was not received, and acknowledgement(s) of receipt may be collected. The acknowledgements of receipt may be collected and recorded over a predetermined time duration. Unicasting the configuration updated data packet and collecting/recording of acknowledgements of receipt may continue for a predetermined (or selected) amount of occurrences. Repetitive sending in this way, or similar way, may increase the likelihood that a configuration update is received by more (ideally all) of the intended endpoint devices.

Figure 11:
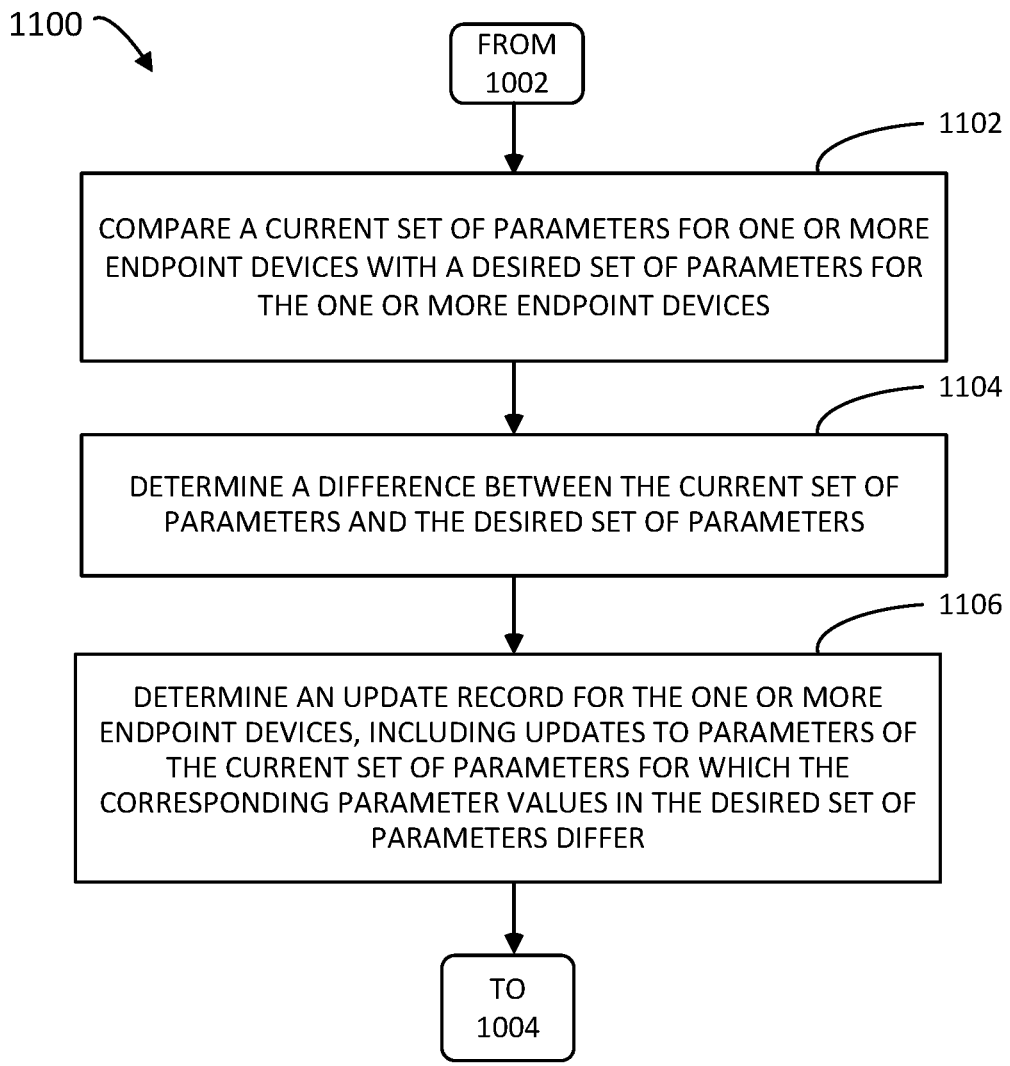
FIG. 11 is a flow diagram illustrating an example process of determining an update plan for one or more endpoint devices, according to an embodiment of the present disclosure.

FIG. 11 is a flow diagram illustrating an example process 1100 of determining an update plan for one or more endpoint devices, according to an embodiment of the present disclosure. Prior to 1004 of process 1000 of FIG. 10, at 1102, a current set of parameters for one or more endpoint devices may be compared with a desired set of parameters for the one or more endpoint devices. At 1104, a difference between the current set of parameters and the desired set of parameters may be determined. At 1106, an update record for the one or more endpoint devices may be created, the update record including updates to parameters of the current set of parameters for which the corresponding parameter values in the desired set of parameters differ. Process 1100 then may proceed at 1004 of process 1000 of FIG. 10.

In an embodiment, process 1100 may be done per level of a configuration parameter hierarchy by the head-end device at central control 106/206/306/406 and/or by configuration manager 112/212/412. For example, for a particular application, the current default level parameter values may be compared to desired default level parameter values to determine the differences, and an update record may be determined for the default parameter values that need to be changed. The data packet created at 1004 of process 1000 may be based on the determined update record. The same process may be followed for group level parameter settings (e.g., for each of one or more defined groups) and also for endpoint or node-specific parameter settings. For the default and group levels, no endpoint devices need to be specified. Since the groups and the global default (which may be considered a global or all-encompassing group) each have assigned to them one or more endpoint device members, the endpoint devices targeted by the change set of parameter values are fixed by the group membership. When node-specific parameter values are analyzed/processed, one or more endpoint devices need to be specified (e.g., in an automated manner or manually by an administrator). The convenience of not having to specify lists of endpoint devices when building configurations contributes to expedient management of these endpoint resources. In an embodiment, when an endpoint device is added to a group (e.g., by an administrator), configuration manager 112/212/412 may use process 1100 to determine what configuration parameters are needed for that assigned group, and may initiate the sending of a unicast configuration parameter update to that endpoint device to bring the endpoint device up to date with regard to its configuration parameter settings. In an embodiment, determining configuration updates may be at least partly automated by running one or more algorithms triggered by, based on, or using information provided by endpoint devices (sensor data, readings, etc., from the endpoint devices, etc.).

In embodiments, an occasional, periodic, or regular check of configuration versions present at an endpoint device may be conducted. For example, an endpoint device or node 104/404 may send a configuration version audit information to a head-end device at central control 106/206/306/406 (and/or possibly to configuration manager 112/212/412). The audit information may be part of the node's normal communication (e.g., to provide data as an interrogation response, a regularly scheduled reporting message, etc.), may be sent in response to a request for configuration information, or may be sent as a regularly scheduled configuration version reporting message. The audit information may contain version information for currently set parameters associated with one or more applications resident on the node. The head-end device or configuration manager may compare the version indications sent to what is expected for that node and may report discrepancies to an administrator and/or may determine/send one or more configuration updates to the node as appropriate to bring the configuration up to date. Such a configuration update may be accomplished by sending a data packet such as data packet 500A/B/C of FIG. 5A/B/C. The configuration update may include a full configuration update (e.g., for all parameters at all levels for one or more given applications) or a partial configuration update (e.g., of just the parameters that need to be updated).

For the configuration version check to work properly, the endpoint device needs to maintain version information for each configuration update. The version information may be provided to the endpoint device with each configuration update sent to the endpoint device (e.g., as shown in data packet 500C of FIG. 5C). In an embodiment, a predetermined notation may be used to package the audit information for sending to the head-end device or configuration manager to concisely indicate the version information for one or more of the hierarchical levels associated with parameter settings at the endpoint device. One such notation may be a dot notation where dots (or periods) separate the version indications for each hierarchical level. For example, for a hierarchy that includes a default or global level, two group levels, and a node-specific level, a quad dot notation may be used (e.g., W.X.Y.Z, where W indicates, for a given application, a default or global version indication, X indicates a first group version indication, Y indicates a second group version indication, and Z indicates a node-specific version indication. Each of the W, X, Y, and Z indicators may be of any predetermined size/notation, as would be understood by one of ordinary skill in the art. For simplicity of discussion, it may be beneficial to describe each indicator as an increasing digit (e.g., whole number) starting at zero, where a zero may indicate that the endpoint device has not been configured at that particular level yet, or that the endpoint device has not been associated with that level (e.g., the endpoint device is not assigned to a group that is assigned to that level). The message may contain a collection of these dot notations (e.g., one for each of one or more applications/agents/features resident at the node). While four hierarchy levels are indicated in a dot notation in this example, any size dot notation may be used as appropriate, depending on how many hierarchy levels have been created for a given application.

Figure 12:
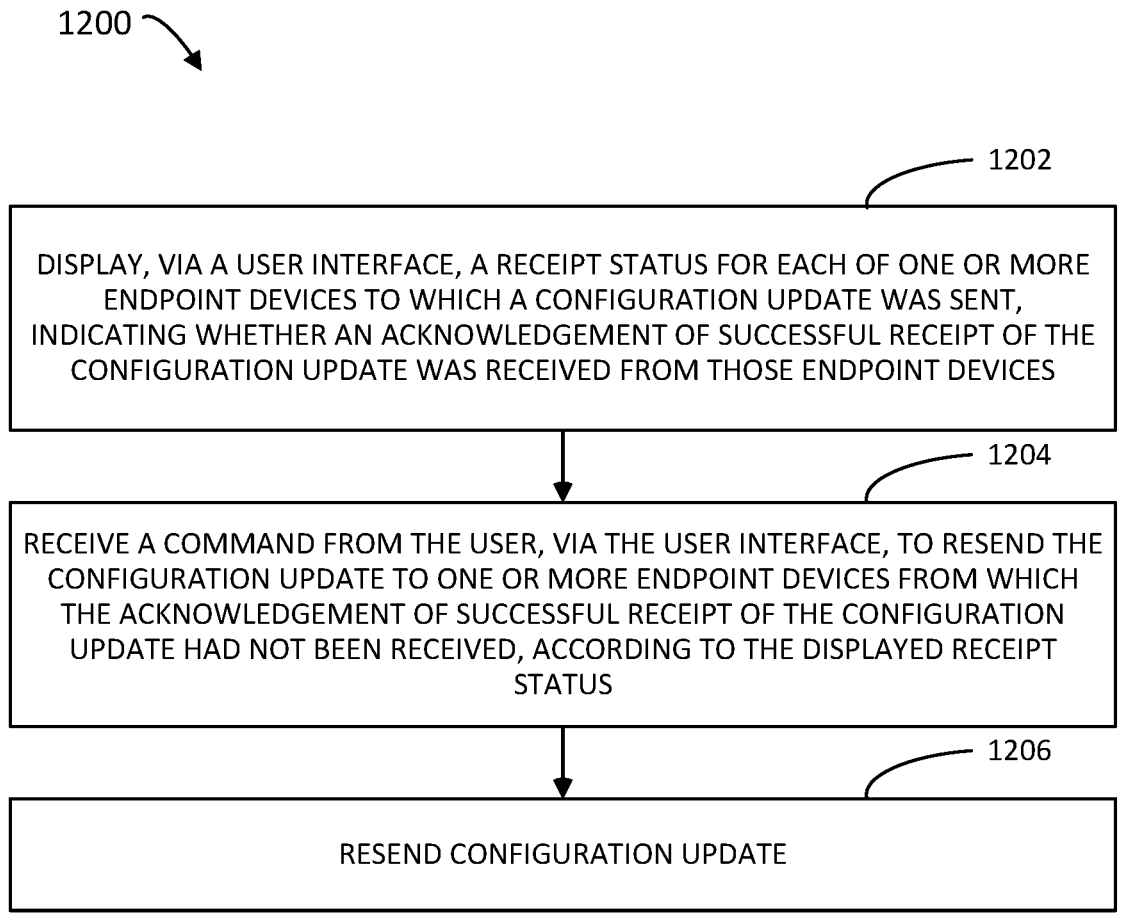
FIG. 12 is a flow diagram illustrating an example process by a user interface for displaying configuration update status and accepting commands to manage a previously sent configuration update to one or more endpoint devices, according to an embodiment of the present disclosure.

FIG. 12 is a flow diagram illustrating an example process 1200 by a user interface for displaying configuration update status and accepting commands to resend a configuration update to one or more endpoint devices, according to an embodiment of the present disclosure. Process 1200 may be followed as a manual alternative to the automated resending process described in process 1000, or in the additional embodiments described above in reference to FIG. 10. At 1202, via a user interface (e.g., at a head-end device at a central control or configuration manager), a receipt status may be displayed for each of one or more endpoint devices to which a configuration update has been sent. The receipt status may indicate whether an acknowledgement of successful receipt of the configuration update was received from the one or more endpoint devices. At 1204, a command may be received from a user (e.g., an administrator), via the user interface, to resend the configuration update to one or more endpoint devices from which the acknowledgement of successful receipt of the configuration update had not been received (e.g., according to the displayed receipt status). At 1206, the configuration update may be resent in response to the received command. The resending of the configuration update may be via unicast or multicast.

Figure 13:
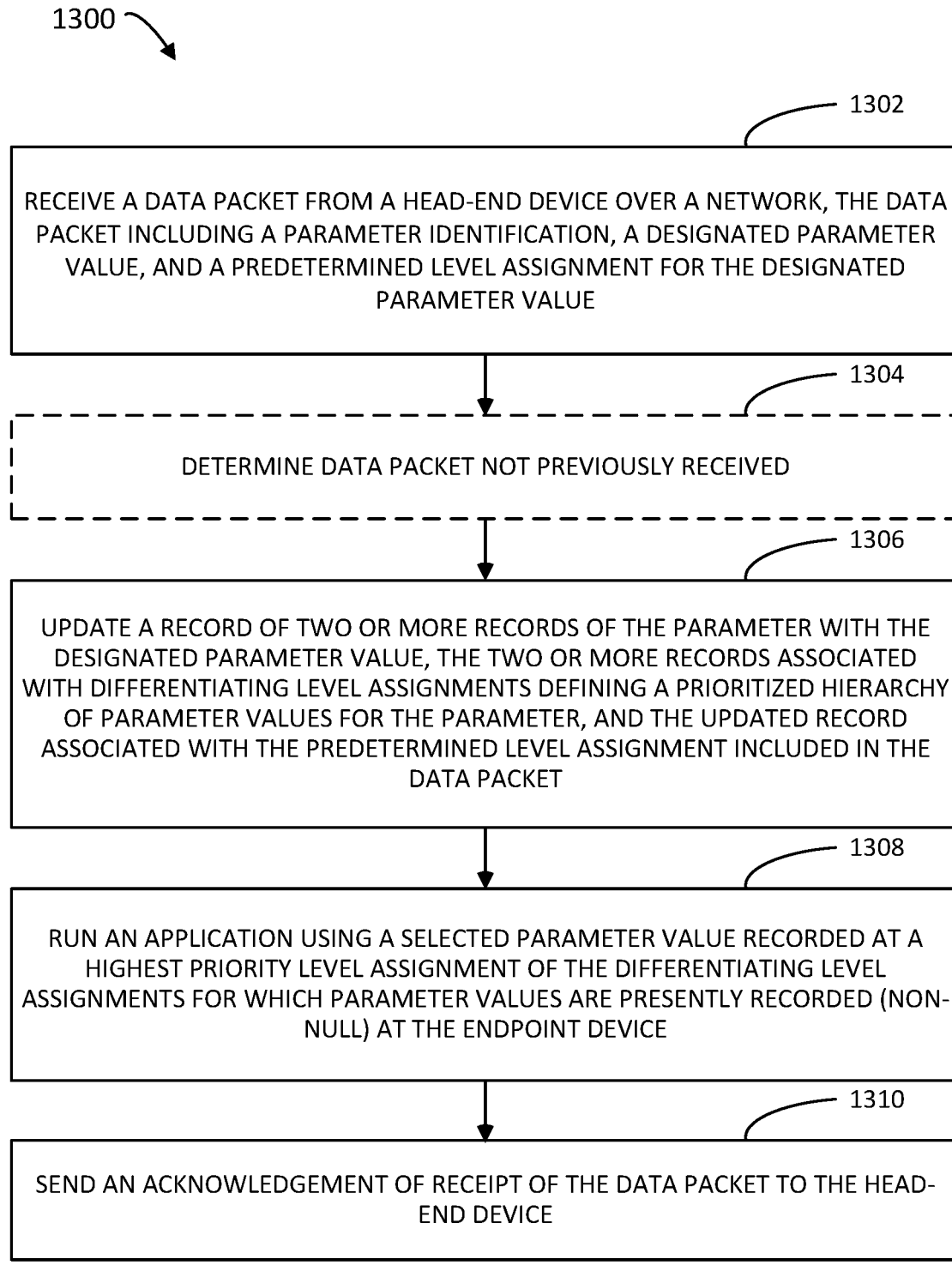
FIG. 13 is a flow diagram illustrating an example process of receiving a configuration update at an endpoint device and using hierarchical storing and selection of a parameter value, according to embodiments of the present disclosure.

FIG. 13 is a flow diagram illustrating an example process 1300 of receiving a configuration update at an endpoint device and using hierarchical selection of a parameter value, according to an embodiment of the present disclosure. At 1302, a data packet may be received from a head-end device (e.g., from central control) over a network. The received data packet may include, for a parameter to be updated, a parameter identification (possibly also indicating the application(s) to which the parameter is applicable), a designated parameter value, and a predetermined level assignment for the designated parameter value. Optionally, at 1304, it may be determined that the data packet was not previously received. In an embodiment, a tag identifier may be used to identify a configuration update data packet, which may be sent multiple times to intended endpoint devices to increase the likelihood of being received by more endpoint devices. If the data packet was previously received and successfully processed, the data packet can be ignored rather than proceeding with process 1300. If proceeding, at 1306, a record of two or more records of the parameter for a given application may be updated with the designated parameter value, where the record to be updated is associated with (or corresponds to) the indicated predetermined level assignment. As discussed earlier in this document, the two or more records for the parameter may be associated with differentiating level assignments that define a prioritized hierarchy of parameter values for the parameter. At 1308, an application may be run that may use the parameter value for the parameter that is recorded at a highest priority level assignment of the differentiating level assignments for which (non-null) parameter values are presently recorded at the endpoint device. At 1310, an acknowledgement of receipt of the data packet may be sent to the head-end device.

Example Environment(s)/Device(s)

Figure 14:
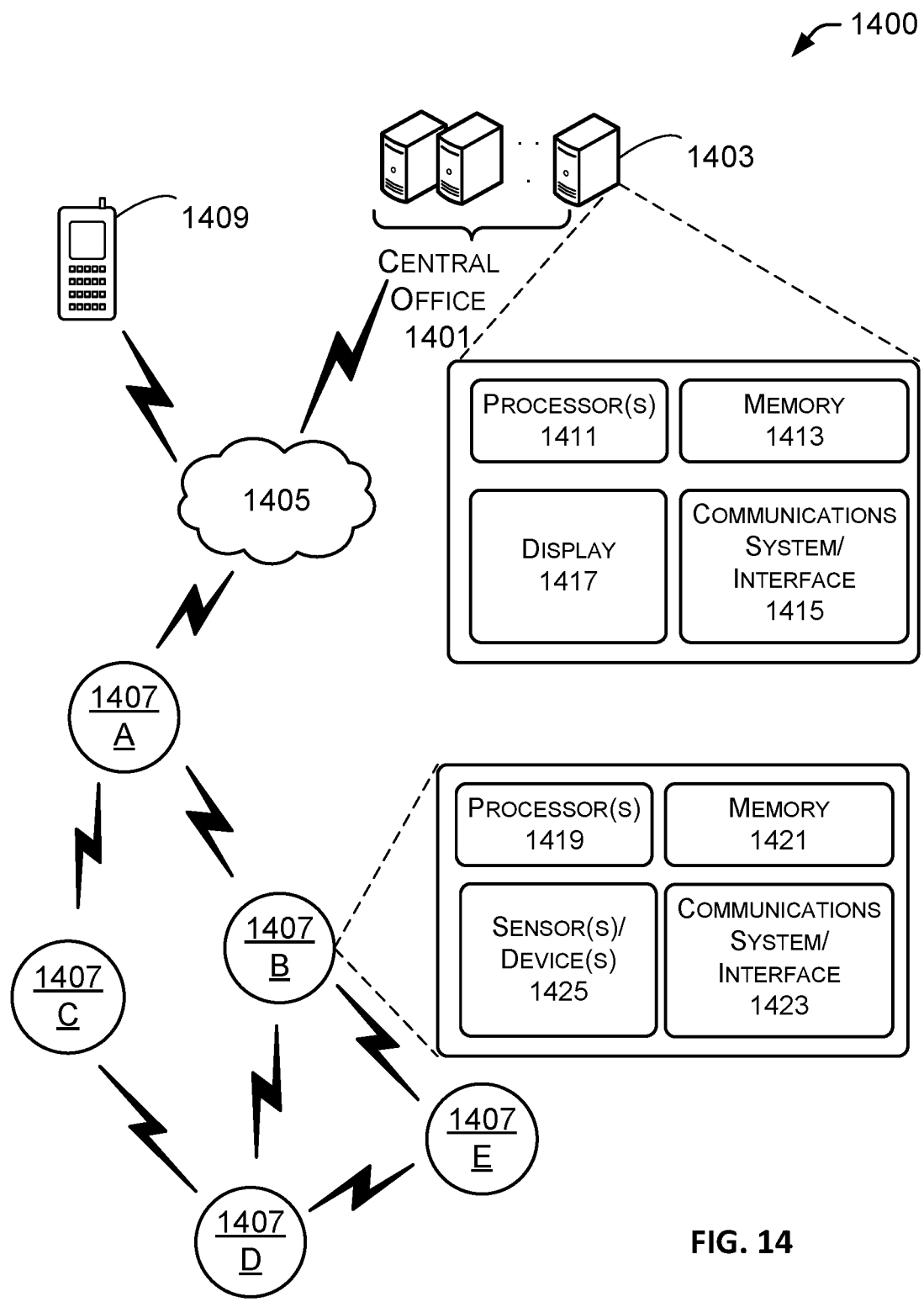
FIG. 14 is an illustration of an example network environment in which example methods, apparatus, and articles of manufacture disclosed herein may be implemented, according to embodiments of the present disclosure.

FIG. 14 is an illustration of an example network environment in which methods, apparatus, and articles of manufacture disclosed herein may be implemented, according to embodiments of the present disclosure. For example, an endpoint device (or node) 104/404/1407 may be a part of an advanced communication system (e.g., a telecommunication system, an advanced meter reading (AMR) network or an advanced metering infrastructure (AMI) network, an Internet of Things (IoT)-based network, etc.), such as data collection network 1400 of FIG. 14, according to embodiments. Data collection network 1400 may include a central office 1401, which may be associated with a data collection/processing entity (e.g., a utility company, in the case of an AMR or AMI network). The central office may include one or more central computing (or head-end) device(s) 1403 that may communicate with network nodes through one or more networks 1405, which may be the Internet or other network having widespread or local functionality. Network nodes may include nodes 1407A-1407E (collectively, nodes 1407), which may include, for example, endpoint devices such as utility meters (e.g., gas meters, water meters, electric meters, etc.), other devices related to a utility network (e.g., relays, repeaters, routers, transformers, or any such utility network computing device), or other communication devices, including those that may comprise or be associated with sensors, actuators, etc. These nodes may be located at various locations (e.g., homes, businesses, etc.). Nodes 1407A-1407E may be configured in a mesh network, star network or other configuration. While only five nodes 1407 are illustrated for simplicity, there may be any number of network nodes. One or more of the network nodes (e.g., device 1407A) may be a data collector and/or concentrator that may be configured for communication (e.g., radio frequency (RF) communication, cellular communication, etc.) with a plurality of downstream nodes 1407B-1407E, which may also be configured for similar communications. In an example operation, data collector 1407A may send and/or receive data or other communications to and/or from nodes 1407B-1407E to be provided to a data collection (or head-end) device 1403 (which may be located at central office 1401), and/or a mobile data collection (or head-end) device 1409. For example, in an AMR or AMI network, data collector 1407A may collect data from nodes 1407B-1407E that may include consumption data or other information associated with a utility meter (e.g., a gas meter, a water meter, an electricity meter, etc.). Additionally, data collector 1407A may send software updates, firmware updates, configuration updates, instructions or other information (which may have been communicated to data collector 1407A from data collection device 1403 or 1409, for example) to one or more of the nodes 1407B-1407E. In an embodiment, one or more network nodes (e.g., nodes 1407A-1407E) may be powered by a battery.

In an expanded view, data collection device 1403 (and/or mobile data collection device 1409) may include, among other components, one or more controllers or processors 1411, a memory 1413, one or more communication systems and/or interfaces 1415 (e.g., configured for RF communications, cellular communications, and/or another type of communications), and optionally a display 1417. Nodes 1407 may include, among other components, one or more controllers or processors 1419, a memory 1421, one or more communication systems and/or interfaces 1423 (e.g., configured for RF communications, cellular communications, and/or another type of communications), and one or more sensors/devices 1425, which may include, for example, one or more measurement sensors or other devices (e.g., meter(s), actuator(s), light(s), etc.). Data collection device 1403 (and/or mobile data collection device 1409) may be a head-end device (e.g., a computing device from central control (106/206/306/406), and each node 1407 may be an endpoint device (104/404).

One or more features disclosed herein may be implemented in hardware, software, firmware, and/or combinations thereof, including discrete and integrated circuit logic, application specific integrated circuit (ASIC) logic, field-programmable gate array (FPGA) logic, programmable logic controller (PLC) logic, and microcontrollers, and may be implemented as part of a domain-specific integrated circuit package, or a combination of integrated circuit packages. The terms software and firmware, as may be used herein, refer to a computer program product including at least one computer readable medium having computer program logic, such as computer-executable instructions, stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, over an electromagnetic wave guide, over a fiber optic cable, through a local or wide area network, through a personal area network (PAN), through a field area network (FAN), or through a network such as the Internet. An example of a non-transitory computer readable medium may be a compact disk, a flash memory, SRAM, DRAM, a hard drive, a solid state drive, or other data storage device.

A processing platform of a data collection device (e.g., data collection device 1403 or mobile data collection device 1409 of FIG. 14), and/or a node (e.g., any of devices 1407) may be embodied in any type of mobile and/or non-mobile computing device. Examples of mobile devices may include, but are not to be limited to, laptop computers, ultra-laptop computers, tablets, touch pads, portable computers, handheld computers, palmtop computers, personal digital assistants (PDAs), e-readers, cellular telephones, combination cellular telephone/PDAs, mobile smart devices (e.g., smart phones, smart tablets, etc.), mobile internet devices (MIDs), mobile messaging devices, mobile data communication devices, mobile media playing devices, cameras, mobile gaming consoles, wearable devices, mobile industrial field devices, etc. Examples of non-mobile devices may include, but are not to be limited to, servers, personal computers (PCs), Internet appliances, televisions, smart televisions, data communication devices, media playing devices, gaming consoles, industrial field devices (e.g., utility meters or other sensors or devices), etc.

Figure 15:
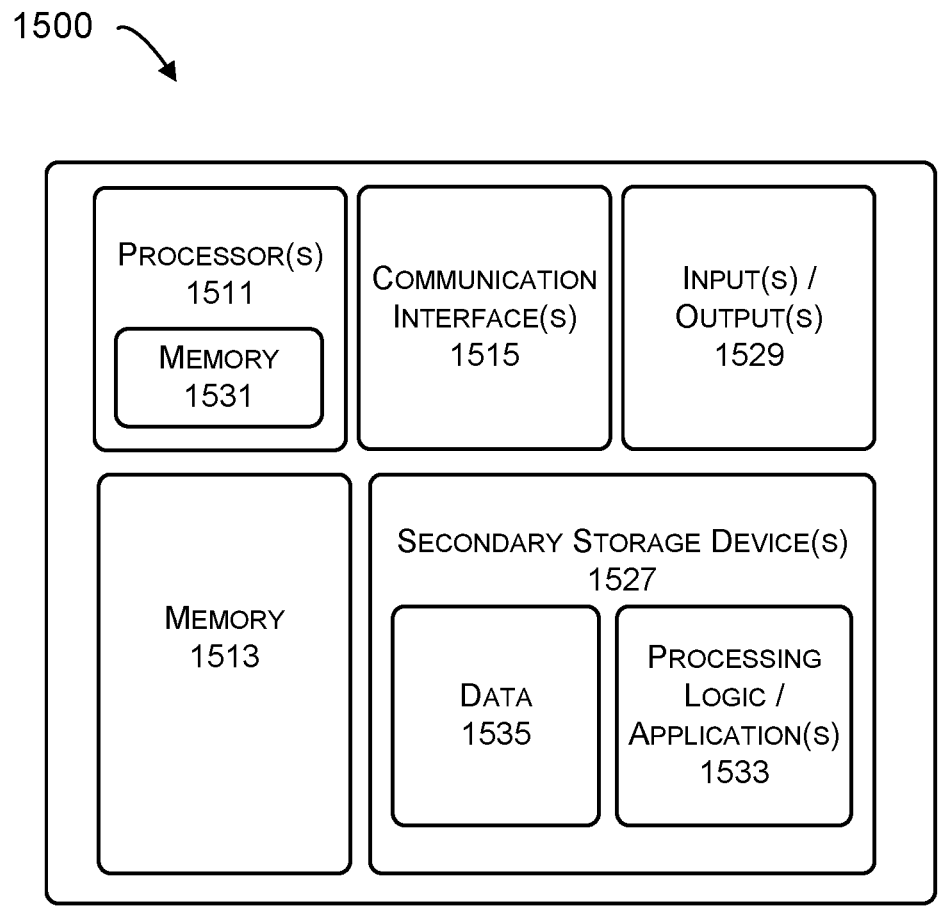
FIG. 15 is a block diagram showing various components of an example data collection device (e.g., device 1403 or device 1409 of FIG. 14), according to an embodiment of the present disclosure.

FIG. 15 is a block diagram of an example processing platform 1500 of a mobile or non-mobile data collection device (e.g., device(s) 1403, 1409), according to embodiments. A data collection device may act as a head-end device (e.g., a computing device from central control (106/206/306/406)) in the context of this disclosure. Processing platform 1500 may include one or more processors 1511, memory 1513, one or more secondary storage devices 1527, one or more input/output ports or devices 1529, and/or one or more communication interfaces 1515, in communication via a bus, line, or similar implementation (not shown). Processing platform 1500 may also include a power supply (not shown), which may include an interface to an electricity source and/or may include one or more batteries.

Processor(s) 1511 may be implemented by, for example but not limitation, one or more integrated circuits, one or more ASIC, FPGA, PLC, or programmable logic device (PLD) circuits, logic circuits, microprocessors, controllers, etc. Processor(s) 1511 may include a local memory 1531 (e.g., a cache), an arithmetic logic unit (ALU), an internal or external bus controller, an internal register file, a floating point unit, a digital signal processer (DSP), an interrupt controller, and/or a memory management unit (MMU). Memory 1513 may include a volatile and/or a non-volatile memory. Volatile memory may be implemented by, for example but not limitation, Static RAM (SRAM), Dynamic RAMs (DRAMS) of any type, including but not limited to: Synchronous Dynamic Random Access Memory (SDRAM), Dynamic Random Access Memory (DRAM), and/or any other type of random access memory device. Non-volatile memory may be implemented by flash memory and/or any other desired type of memory device. Access to memory 1513 may be controlled by a memory controller (not shown). Data stored in memory 1513 and/or local memory 1531 may be used by processor(s) 1511 to facilitate data collection functions and/or communications, calculations/computations (e.g., if not done at the node device(s) or elsewhere), etc., according to embodiments of this disclosure.

Input/output port(s)/device(s) 1529 may allow a user or an external device to interface with processor(s) 1511. Input devices may allow a user to enter data and/or commands for processor(s) 1511. Input devices may include, for example, an audio sensor, a microphone, a camera (e.g., still, video, etc.), a keyboard, a button, a mouse, a touchscreen, a track-pad, a trackball, isopoint, a voice recognition system, etc. Output devices may provide or present information to a user. Output devices may include, for example, display devices such as display device 1417. Examples of other display devices may include a light emitting diode (LED), an organic light emitting diode (OLED), a liquid crystal display, a cathode ray tube display (CRT), a touchscreen, a tactile output device, a printer, speakers, etc. User interface screens, such as user interface screens of FIGS. 8 and 9, may be displayed on a display device. The input/output port(s)/device(s) may be connected to processor(s) 1511, for example, with an interface circuit (not shown). The interface circuit may be implemented by any type of interface standard, such as, for example, an Ethernet interface, a universal serial bus (USB), a PCI express interface, etc. For use with an output device, the interface circuit may include a graphics driver card, chip, and/or processor.

Communication interface(s) 1515 may be implemented in hardware or a combination of hardware and software, and may provide wired or wireless network interface(s) to one or more networks, such as network(s) 1405 of FIG. 14. Communication interface(s) 1515 may be a part of, or connected with, the interface circuit discussed above, and/or may include or connect with communication devices such as a transmitter, a receiver, a transceiver, a modem and/or network interface card to facilitate exchange of data with external devices via a network, such as network(s) 1405. In an embodiment, security mechanisms may be used to provide secure communications, as would be understood by one of ordinary skill in the art.

Secondary storage device(s) 1527 may store processing logic 1533 (e.g., software) to be executed by processor(s) 1511, and/or may store data 1535. Processing logic 1533 and data 1535 may be used by processor(s) 1511 to facilitate data collection functions and/or communications between devices, calculations/computations (e.g., if not done at the node device(s) or elsewhere), etc., according to embodiments of this disclosure. Processing logic 1533 may include instructions for executing the methodology described herein for data communications and processing, for example, which may also include data packet generation/processing and/or configuration management. Processing logic may also include applications (or agents or features), such as those described herein. Examples of secondary storage device(s) 1527 may include one or more hard drive disks, including but not limited to electro-mechanical hard drives and FLASH memory hard drives (SSDs), compact disk (CD) drives, digital versatile disk (DVD) drives, Blu-ray disk drives, redundant array of independent disks (RAID) systems, floppy disk drives, flash drives, etc. Data and/or processing logic may be stored on a removable tangible computer readable storage medium (e.g., a floppy disk, a CD, a DVD, a Blu-ray disk, etc.) using one or more of the secondary storage device(s) 1527.

Figure 16:
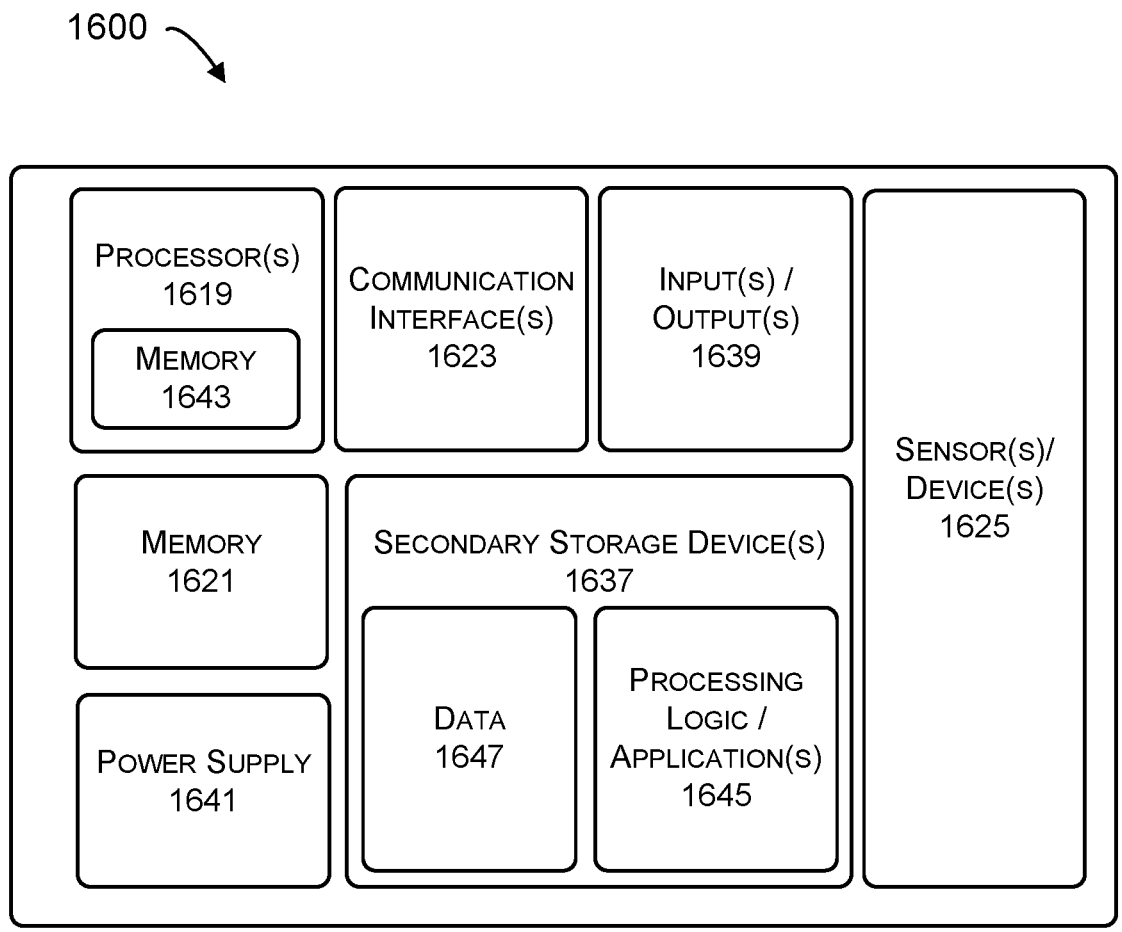
FIG. 16 is a block diagram showing various components of an example network node (e.g., one of devices 1407 of FIG. 14), according to an embodiment of the present disclosure.

FIG. 16 is a block diagram of an example processing platform 1600 of a node device (e.g., 1407), according to embodiments. A node device may be an endpoint device in the context of this disclosure. Processing platform 1600 may include one or more processors 1619, memory 1621, one or more secondary storage devices 1637, one or more input/output ports or devices 1639, and/or one or more communication interfaces 1623, in communication via a bus, line, or similar implementation (not shown). Processing platform 1600 may also include a power supply 1641, which may include an interface to an electricity source and/or may include one or more batteries. Platform 1600 may also include one or more sensors/devices 1625, which may include, for example, one or more measurement sensors or other devices (e.g., meter(s), actuator(s), light(s), etc.).

Processor(s) 1619 may be implemented by, for example but not limitation, one or more integrated circuits, one or more ASIC, FPGA, PLC, or PLD circuits, logic circuits, microprocessors, controllers, etc. Processor(s) 1619 may include a local memory 1643 (e.g., a cache), an ALU, an internal or external bus controller, an internal register file, a floating point unit, a DSP, an interrupt controller, and/or a MMU. Memory 1621 may include a volatile and/or a non-volatile memory. Volatile memory may be implemented by, for example but not limitation, Static RAM (SRAM), Dynamic RAMs (DRAMS) of any type, including but not limited to: Synchronous Dynamic Random Access Memory (SDRAM), Dynamic Random Access Memory (DRAM), and/or any other type of random access memory device. Non-volatile memory may be implemented by flash memory and/or any other desired type of memory device. Access to memory 1621 may be controlled by a memory controller (not shown). Data stored in memory 1621 and/or local memory 1643 may be used by processor(s) 1619 to facilitate data collection functions, calculations/computations, metering functions and/or metering calculations/computations (if embodied in a utility meter), and/or communications, etc., according to embodiments of this disclosure.

Input/output port(s)/device(s) 1639 may allow a user or an external device to interface with processor(s) 1619. Input devices may allow a user to enter data and/or commands for processor(s) 1619. Input devices may include, for example, an audio sensor, a microphone, a camera (e.g., still, video, etc.), a keyboard, a button, a mouse, a touchscreen, a track-pad, a trackball, isopoint, a voice recognition system, etc. Output devices may provide or present information to a user. Output devices may include, for example, display devices (e.g., a light emitting diode (LED), an organic light emitting diode (OLED), a liquid crystal display, a cathode ray tube display (CRT), a touchscreen, a tactile output device, a printer, speakers, etc.). The input/output port(s)/device(s) 1639 may be connected to processor(s) 1619, for example, with an interface circuit (not shown). The interface circuit may be implemented by any type of interface standard, such as, for example, an Ethernet interface, a universal serial bus (USB), a PCI express interface, etc. For use with an output device, the interface circuit may include a graphics driver card, chip, and/or processor.

Communication interface(s) 1623 may be implemented in hardware or a combination of hardware and software, and may provide wired or wireless network interface(s) to one or more networks, such as network(s) 1405 of FIG. 14. Communication interface(s) 1623 may be a part of, or connected with, the interface circuit discussed above, and/or may include or connect with communication devices such as a transmitter, a receiver, a transceiver, a modem and/or network interface card to facilitate exchange of data with external devices via a network, such as network(s) 1405. In an embodiment, security mechanisms may be used to provide secure communications, as would be understood by one of ordinary skill in the art.

Secondary storage device(s) 1637 may store processing logic 1645 (e.g., software) to be executed by processor(s) 1619, and/or may store data 1647. Processing logic 1645 and data 1647 may be used by processor(s) 1619 to facilitate sensor data collection functions, metering functions and/or metering calculations/computations if embodied in a utility meter, and/or communications between devices, etc., according to embodiments of this disclosure. Processing logic 1645 may include instructions for executing the methodology described herein, which may also include data packet generation and/or configuration management. Processing logic may also include applications (or agents or features), such as those described herein. Examples of secondary storage device(s) 1637 may include one or more hard drive disks, including but not limited to electro-mechanical hard drives and FLASH memory hard drives (SSDs), compact disk (CD) drives, digital versatile disk (DVD) drives, Blu-ray disk drives, redundant array of independent disks (RAID) systems, floppy disk drives, flash drives, etc. Data and/or processing logic may be stored on a removable tangible computer readable storage medium (e.g., a floppy disk, a CD, a DVD, a Blu-ray disk, etc.) using one or more of the secondary storage device(s) 1637.

The foregoing description discloses techniques for distributing and maintaining configuration settings using hierarchical levels of configuration parameters at one or more networked endpoint devices. The techniques described herein may apply to any network of nodes that need configuration parameters for their installed application(s). Configuration updates may be sent to multiple endpoint devices via multicast, minimizing bandwidth consumption. However, the described techniques are beneficial even on networks where bandwidth is abundant. For example, the ability to simplify the management of configuration parameters on a large number of potentially dissimilar endpoint devices is provided. This is accomplished by allowing individual endpoint devices to have different configurations applied to them at a higher priority level if needed, while still maintaining other levels of parameter settings in case those settings are needed in the future. The hierarchical configuration methods as described herein are scalable, customizable, and allow for easy upgrade or downgrade (e.g., roll back) of configurations. Furthermore, the hierarchical configuration techniques can address corner-case problems, such as quick enrollment or unenrollment in configuration groups, out-of-sequence configuration updates, etc.

The versatility of this hierarchical configuration allows for the handling of otherwise difficult node device implementations. Examples of such difficult implementations may include those that are found in many Internet of Things (IoT) device networks, where multiple endpoint devices are connected together in an ad-hoc manner (e.g., using a routing protocol for low-power and lossy (RPL) networks). Other types of networks that may benefit from the described techniques may include LAN- or WAN-based networks of endpoint devices (such as networking routers and switches), networked smartphones or other personal devices (possibly using one or more network connectivity methods such as Bluetooth, Wi-Fi, etc.), or other networked devices (e.g., medical devices such as personal insulin pumps, home alarm systems, home appliances, traffic light controllers, automobile devices, etc.).

The hierarchical structure of the disclosed techniques enables manageability of configuration parameters and updates, which is important when simultaneously managing many endpoint devices. A user interface makes managing groups of endpoint devices and their configuration parameters by an administrator even more straightforward. The user interface may allow for monitoring status of endpoint devices and groups of endpoint devices as well as configuration updates thereof, querying endpoint devices and groups of endpoint devices, and managing endpoint devices and groups of endpoint devices as well as their configurations. The user interface may also allow viewing of a physical topology of endpoint devices, where the physical topology may also be used by an administrator in endpoint device/configuration management.

The particular examples used in this document are for ease of understanding and are not to be limiting. The description herein is, at times, directed to utility metering (e.g., of gas, water, electricity, etc.). In such an implementation, the applications may be directed to managing flow measurement and reporting, managing safety considerations, managing utility outages, analyzing reported data, etc., using parameters associated with such applications (e.g., units used (e.g., standard distances vs. metric distances, Celsius vs. Fahrenheit, etc.), thresholds (e.g., elevation, temperature, flow, pressure, etc.), etc., as would be understood by those of ordinary skill in the utility industry). However, systems and techniques described herein may be used in many other contexts that may or may not involve utility metering (e.g., various network communication systems, IoT networks, WSN networks, etc.). As would be understood by one of ordinary skill in the art, the network bandwidth-saving features and other features discussed herein may be beneficial in any communication system, including many other systems and technology spaces that may involve communications and applications that use parameters in some way (e.g., industrial manufacturing, mining, agriculture, transportation, etc.), including in fields yet unknown.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method of receiving a configuration setting update at an endpoint device in a communication system, the method comprising:
    sending over a network, to a head-end device via a transceiver of the endpoint device, a version audit that includes version information for one or more applications used at the endpoint device, the version information associated with parameter values set at one or more hierarchical level assignments and including, for at least one of the one or more applications, a dot notation per application including a version indication for each of a set of parameter values that are set at each hierarchical level, each version indication separated by a dot;
    receiving, via the transceiver of the endpoint device, a data packet from the head-end device, the data packet including one or more parameter updates, each parameter update including:
        a parameter identification;
        a designated parameter value for a parameter identified by the parameter identification; and
        a predetermined level assignment for the designated parameter value, the one or more parameter updates including updates for parameters associated with a difference between a current configuration and a desired configuration, the difference determined based on the version audit;
    updating, by a processor of the endpoint device, a record of two or more records of each parameter with the parameter's respective designated parameter value, the two or more records associated with differentiating level assignments defining a prioritized hierarchy of parameter values for the parameter at the endpoint device, and the updated record associated with the predetermined level assignment included in the data packet; and
    running, by the processor, an application using one or more selected parameter values, each selected parameter value recorded at a highest priority level assignment of the differentiating level assignments for which parameter values for the parameter associated with the selected parameter value are presently recorded at the endpoint device.

2. The method of claim 1, further comprising:
    sending an acknowledgement of receipt of the data packet to the head-end device,
    wherein the acknowledgement is one of an acknowledgement of successful receipt or an error message.

3. The method of claim 2, wherein the sending an acknowledgement of receipt is postponed until one or more other messages are to be sent to the head-end device such that the acknowledgement of receipt and other messages are combined into a minimal number of transmissions in order to conserve network bandwidth.

4. The method of claim 1, wherein the differentiating level assignments for each parameter at the endpoint device include:
    a first level assignment; and
    a second level assignment that ranks lower in priority than the first level assignment.

5. The method of claim 4, wherein the differentiating level assignments further include a third level assignment that ranks lower in priority than the second level assignment, and wherein:
    the first level assignment is for an individual parameter value of the parameter that is specific to the endpoint device;
    the second level assignment is for a group parameter value of the parameter that is specific to a predetermined group of endpoint devices to which the endpoint device belongs; and
    the third level assignment is for a default parameter value of the parameter for all endpoint devices of the communication system to which the endpoint device belongs that use the parameter.

6. The method of claim 5, wherein the predetermined level assignment is the second level assignment, and wherein the data packet includes an address associated with the predetermined group of endpoint devices.

7. The method of claim 5, wherein the predetermined level assignment is the first level assignment, and wherein the data packet includes an address associated with only the endpoint device.

8. The method of claim 1, wherein the data packet includes a tag identifier that identifies a configuration setting update and indicates a placement in an order of configuration data packets, and wherein when the tag identifier for the data packet indicates that the data packet is out of order such that a previously received data packet is a more recent configuration update, the present data packet is ignored by the endpoint device.

9. The method of claim 1, wherein for at least one of the parameters the designated parameter value is null, and wherein updating the record includes updating the record with the null value, such that the updated record is not considered when determining which recorded parameter value at the endpoint device is at a highest priority level assignment.

10. The method of claim 1, wherein the endpoint device belongs to a first group and also to a second group assigned to a higher priority level than the first group, wherein the parameter identified by the parameter identification is changeable for both the first group and the second group, and wherein the parameter's value as set for the second group takes priority over the parameter's value as set for the first group due to the higher priority level of the second group.

11. The method of claim 1, wherein the endpoint device belongs to a first group and also to a second group, wherein the parameter identified by the parameter identification is changeable for both the first group and the second group, and wherein the method further comprises:
determining whether the parameter value is set as designated for the first group or as designated for the second group based on one or more additional configuration parameters.

12. The method of claim 1, wherein the endpoint device belongs to a first group and also to a second group, wherein the parameter identified by the parameter identification is changeable for both the first group and the second group, and wherein the method further comprises:
determining whether the parameter value is set as designated for the first group or as designated for the second group based on predetermined arbitration guidelines set to prevent parameter conflicts.

13. An endpoint device of a communication system, the endpoint device comprising:
a processor;
a transceiver communicably coupled with the processor, the transceiver configured to communicate with a head-end device over a network; and
a memory communicably coupled with the processor, the memory storing instructions that, when executed by the processor, direct the processor to:
send, to the head-end device, a version audit that includes version information for one or more applications used at the endpoint device, the version information associated with parameter values set at one or more hierarchical level assignments and including, for at least one of the one or more applications, a dot notation per application including a version indication for each of a set of parameter values that are set at each hierarchical level, each version indication separated by a dot;
receive a data packet from the head-end device, the data packet including one or more parameter updates, each parameter update including:
a parameter identification;
a designated parameter value for a parameter identified by the parameter identification; and
a predetermined level assignment for the designated parameter value,
the one or more parameter updates including updates for parameters associated with a difference between a current configuration and a desired configuration, the difference determined based on the version audit;
update a record of two or more records of each parameter with the parameter's respective designated parameter value, the two or more records associated with differentiating level assignments defining a prioritized hierarchy of parameter values for the parameter at the endpoint device, and the updated record associated with the predetermined level assignment included in the data packet; and
run an application using one or more selected parameter values, each selected parameter value recorded at a highest priority level assignment of the differentiating level assignments for which parameter values for the parameter associated with the selected parameter value are presently recorded at the endpoint device.

14. The endpoint device of claim 13, wherein the differentiating level assignments for each parameter at the endpoint device include:
a first level assignment; and
a second level assignment that ranks lower in priority than the first level assignment.

15. The endpoint device of claim 14, wherein the differentiating level assignments further include a third level assignment that ranks lower in priority than the second level assignment, and wherein:
the first level assignment is for an individual parameter value of the parameter that is specific to the endpoint device;
the second level assignment is for a group parameter value of the parameter that is specific to a predetermined group of endpoint devices to which the endpoint device belongs; and
the third level assignment is for a default parameter value of the parameter for all endpoint devices of the communication system to which the endpoint device belongs that use the parameter.

16. The endpoint device of claim 13, wherein the data packet includes a tag identifier that identifies a configuration setting update and indicates a placement in an order of configuration data packets, and wherein when the tag identifier for the data packet indicates that the data packet is out of order such that a previously received data packet is a more recent configuration update, the present data packet is ignored by the endpoint device.

17. The endpoint device of claim 13, wherein for at least one of the parameters the designated parameter value is null, and wherein updating the record includes updating the record with the null value, such that the updated record is not considered when determining which recorded parameter value at the endpoint device is at a highest priority level assignment.

18. At least one non-transitory computer-readable medium having computer program logic stored thereon, the computer program logic including instructions that, when executed by a processor of an endpoint device of a communications system, cause the processor to:
- send over a network, to a head-end device via a transceiver of the endpoint device, a version audit that includes version information for one or more applications used at the endpoint device, the version information associated with parameter values set at one or more hierarchical level assignments and including, for at least one of the one or more applications, a dot notation per application including a version indication for each of a set of parameter values that are set at each hierarchical level, each version indication separated by a dot;
- receive a data packet from the head-end device, the data packet including one or more parameter updates, each parameter update including:
  - a parameter identification;
  - a designated parameter value for a parameter identified by the parameter identification; and
  - a predetermined level assignment for the designated parameter value, the one or more parameter updates including updates for parameters associated with a difference between a current configuration and a desired configuration, the difference determined based on the version audit;
- update a record of two or more records of each parameter with the parameter's respective designated parameter value, the two or more records associated with differentiating level assignments defining a prioritized hierarchy of parameter values for the parameter at the endpoint device, and the updated record associated with the predetermined level assignment included in the data packet; and
- run an application using one or more selected parameter values, each selected parameter value recorded at a highest priority level assignment of the differentiating level assignments for which parameter values for the parameter associated with the selected parameter value are presently recorded at the endpoint device.

19. The non-transitory computer-readable medium of claim 18, wherein the differentiating level assignments for each parameter at the endpoint device include:
- a first level assignment; and
- a second level assignment that ranks lower in priority than the first level assignment.

20. The non-transitory computer-readable medium of claim 19, wherein the differentiating level assignments further include a third level assignment that ranks lower in priority than the second level assignment, and wherein:
- the first level assignment is for an individual parameter value of the parameter that is specific to the endpoint device;
- the second level assignment is for a group parameter value of the parameter that is specific to a predetermined group of endpoint devices to which the endpoint device belongs; and
- the third level assignment is for a default parameter value of the parameter for all endpoint devices of the communication system to which the endpoint device belongs that use the parameter.

21. The non-transitory computer-readable medium of claim 18, wherein the data packet includes a tag identifier that identifies a configuration setting update and indicates a placement in an order of configuration data packets, and wherein when the tag identifier for the data packet indicates that the data packet is out of order such that a previously received data packet is a more recent configuration update, the present data packet is ignored by the endpoint device.

22. The non-transitory computer-readable medium of claim 18, wherein for at least one of the parameters the designated parameter value is null, and wherein updating the record includes updating the record with the null value, such that the updated record is not considered when determining which recorded parameter value at the endpoint device is at a highest priority level assignment.

* * * * *